US012081276B2

(12) United States Patent
Sakib et al.

(10) Patent No.: US 12,081,276 B2
(45) Date of Patent: Sep. 3, 2024

(54) OPTICAL COHERENT RECEIVER ON A CHIP

(71) Applicant: Intel Corporation, Santa Clara, CA (US)

(72) Inventors: Meer Nazmus Sakib, Berkeley, CA (US); Peicheng Liao, Santa Clara, CA (US); Ranjeet Kumar, San Jose, CA (US); Duanni Huang, San Jose, CA (US); Haisheng Rong, Pleasanton, CA (US); Harel Frish, Albuquerque, NM (US); John Heck, Berkeley, CA (US); Chaoxuan Ma, Sunnyvale, CA (US); Hao Li, Hillsboro, OR (US); Ganesh Balamurugan, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 599 days.

(21) Appl. No.: 17/133,360

(22) Filed: Dec. 23, 2020

(65) Prior Publication Data

US 2021/0119710 A1    Apr. 22, 2021

Related U.S. Application Data

(60) Provisional application No. 63/041,478, filed on Jun. 19, 2020.

(51) Int. Cl.
*H04B 10/61* (2013.01)

(52) U.S. Cl.
CPC ....... *H04B 10/6165* (2013.01); *H04B 10/612* (2013.01); *H04B 10/6164* (2013.01)

(58) Field of Classification Search
None
See application file for complete search history.

(56) References Cited

U.S. PATENT DOCUMENTS 7,616,904 B1* 11/2009 Gunn, III ............ H01L 31/0232
                                                              257/431
2006/0083144 A1   4/2006  Piede et al.
(Continued)

OTHER PUBLICATIONS

Doerr et al., "Monolithic Polarization and Phase Diversity Coherent Receiver in Silicon," J. Lightwave Technol. 28, (2010), 6 pages.
(Continued)

*Primary Examiner* — David W Lambert
(74) *Attorney, Agent, or Firm* — Schwabe, Williamson & Wyatt, P.C.

(57) ABSTRACT

Embodiments described herein may be related to apparatuses, processes, and techniques related to coherent optical receivers, including coherent receivers with integrated all-silicon waveguide photodetectors and tunable local oscillators implemented within CMOS technology. Embodiments are also directed to tunable silicon hybrid lasers with integrated temperature sensors to control wavelength. Embodiments are also directed to post-process phase correction of optical hybrid and nested I/Q modulators. Embodiments are also directed to demultiplexing photodetectors based on multiple microrings. In embodiments, all components may be implements on a silicon substrate. Other embodiments may be described and/or claimed.

15 Claims, 17 Drawing Sheets

(56) References Cited

U.S. PATENT DOCUMENTS

| | | | | |
|---|---|---|---|---|
| 2010/0303476 | A1* | 12/2010 | Barton | H04B 10/6151 |
| | | | | 359/489.08 |
| 2011/0038631 | A1* | 2/2011 | Doerr | G02B 6/126 |
| | | | | 385/37 |
| 2012/0189307 | A1 | 7/2012 | Salsi et al. | |
| 2013/0170843 | A1 | 7/2013 | Baney | |
| 2014/0285867 | A1 | 9/2014 | Wagener | |
| 2016/0285561 | A1 | 9/2016 | Wu et al. | |
| 2017/0026134 | A1 | 1/2017 | Ciaramella et al. | |
| 2019/0285815 | A1* | 9/2019 | Sugiyama | G02B 6/125 |
| 2021/0119710 | A1 | 4/2021 | Sakib et al. | |

OTHER PUBLICATIONS

J. Verbist et al., "112 Gbit/s Single-Polarization Silicon Coherent Receiver with Hybrid-Integrated BiCMOS Linear TIA," 2015 European Conference on Optical Communication (ECOC), Valencia, 2015, 3 pages.

S. B. Estrella et al., "Widely Tunable Compact Monolithically Integrated Photonic Coherent Receiver," in IEEE Photonics Technology Letters, vol. 24, No. 5, Mar. 1, 2012, 3 pages.

H. Guan et al. "Widely-tunable, narrow-linewidth III-V/silicon hybrid external-cavity laser for coherent communication" Optics Express vol. 26, No. 7, Apr. 2, 2018, 14 pages.

Abdul-Majid et al. "Design, simulation, and fabrication of a 90° SOI optical hybrid based on the self-imaging principle" SPIE Photonics Europe, 2010, Brussels, Belgium, 10 pages.

P. Dong et al. "Monolithic Silicon Photonic Integrated Circuits for Compact 100+Gb/s Coherent Optical Receivers and Transmitters" IEEE Journal of Selected Topics in Quantum Electronics, vol. 20, No. 4, Jul./ Aug. 2014, 8 pages.

M. Finot et al. "Automated Optical Packaging Technology for 10 Gb/s Transceivers and its Application to a Low-Cost Full C-Band Tunable Transmitter" Intel Technology Journal, vol. 8, Issue 2, 2004, 15 pages.

Y. Gao et al. "High-Power, Narrow-Linewidth, Miniaturized Silicon Photonic Tunable Laser With Accurate Frequency Control" Journal of Lightwave Technology, vol. 38, No. 2, Jan. 15, 2020, 7 pages.

N. Mehta et al. "A Laser-Forwarded Coherent Transceiver in 45-nm SOI CMOS Using Monolithic Microring Resonators" IEEE Journal of Solid-State Circuits, vol. 55, No. 4, Apr. 2020, 12 pages.

M. Sakib et al., "Demonstration of a 50 Gb/s all-silicon waveguide photodetector for photonic integration" Conference on Lasers and Electro-Optics (CLEO), Aug. 9, 2018, 2 pages.

X. Yu et al., "Electrical annealing for Ge ion-implanted directional couplers" Proceedings vol. 11285, Silicon Photonics XV; 1128512 (2020), 7 pages.

J. Zheng et al., "GST-on-silicon hybrid nanophotonic integrated circuits: a non-volatile quasi-continuously reprogrammable platform" Optical Materials Express 1551, vol. 8, No. 6, Jun. 1, 2018, 11 pages.

International Search Report and Written Opinion mailed Sep. 3, 2021 for International Application No. PCT/US2021/033011, 13 pages.

International Preliminary Report on Patentability mailed Dec. 29, 2022 for International Application No. PCT/US2021/033011, 8 pages.

Lu et al., "Monolithic Integration of a High-Speed Widely Tunable Optical Coherent Receiver," J. Lightwave Technol. 28, (2010), 6 pages.

OIF-IC-TROSA-01.0, "Implementation Agreement for Integrated Coherent Transmit-Receive Optical Sub Assembly," Aug. 20, 2019, 170 pages.

* cited by examiner

ADDITIONAL LOSS AND PHASE SHIFT FROM GE TRIMMING IN INTEL SI PHOTONICS PROCESS

PROGRAMMABLE PHASE SHIFTER
EMBODIMENT OF A I/Q MODULATOR

DWDM COHERENT RECEIVER BASED ON ALL-PASS MICRORING DEMULTIPLEXING PHOTODETECTORS

DWDM COHERENT RECEIVER ADD-DROP MICRORING DEMULTIPLEXING PHOTODETECTORS

OPTICAL COHERENT RECEIVER ON A CHIP

PRIORITY CLAIM

This application claims priority to U.S. Provisional Application No. 63/041,478 filed Jun. 19, 2020. The specification of this application is hereby incorporated by reference in its entirety.

FIELD

Embodiments of the present disclosure generally relate to the field of photonics devices, and in particular to coherent optical receivers.

BACKGROUND

Continued growth in virtual machines and cloud computing will continue to increase the demand for increased performance and reduced size of computing devices by integrating photonics-based devices such as optical receivers.

DETAILED DESCRIPTION

Figure 1:
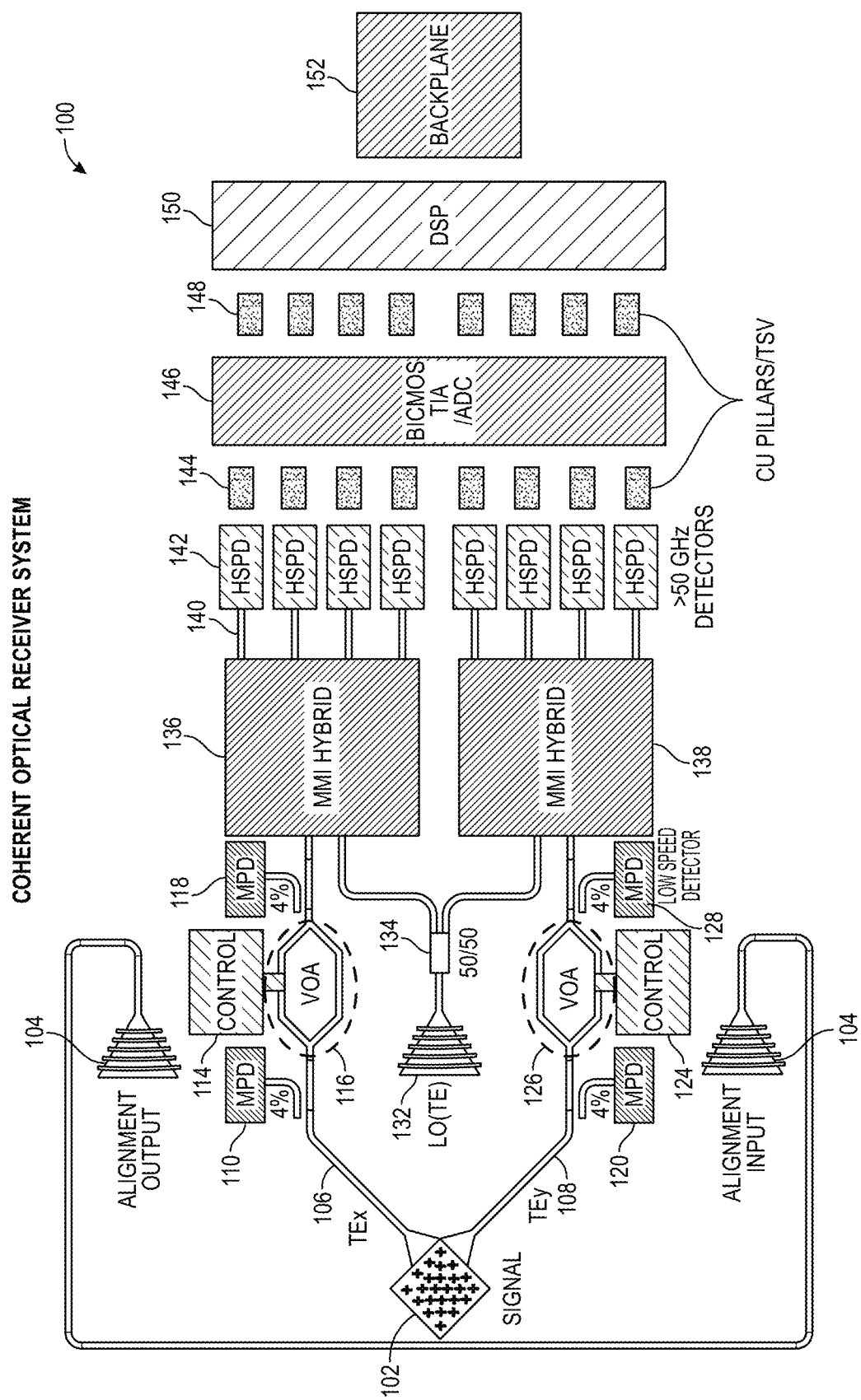
FIG. 1 is a diagram of an optical coherent receiver with integrated all-silicon optical hybrid, waveguide photodetectors and tunable local oscillator (LO), in accordance with various embodiments.

Coherent optical receivers are used to receive data contained within optical signals. Coherent optical receivers typically receive an optical signal, which may include signals on multiple wavelengths within a fiber, and combine that received signal with one or more local oscillator (LO) signal. In embodiments, the LO signal may be tunable. The combination may be done with a 90° optical hybrid component. The resulting combined optical signal may be sent to photodetectors for eventual conversion of the optical signal into digital signals.

Embodiments described herein are generally directed to coherent optical receivers, including coherent receivers with integrated all-silicon waveguide photodetectors and tunable local oscillators implemented within CMOS technology. Embodiments are also directed to tunable III-V silicon hybrid lasers with integrated temperature sensors to control wavelength. Embodiments are also directed to post-process phase correction of optical hybrid and nested I/Q modulators. Embodiments are also directed to demultiplexing photodetectors based on microrings.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

Various operations may be described as multiple discrete operations in turn, in a manner that is most helpful in understanding the claimed subject matter. However, the order of description should not be construed as to imply that these operations are necessarily order dependent.

As used herein, the term "module" may refer to, be part of, or include an ASIC, an electronic circuit, a processor (shared, dedicated, or group) and/or memory (shared, dedicated, or group) that execute one or more software or firmware programs, a combinational logic circuit, and/or other suitable components that provide the described functionality.

Various Figures herein may depict one or more layers of one or more package assemblies. The layers depicted herein are depicted as examples of relative positions of the layers of the different package assemblies. The layers are depicted for the purposes of explanation, and are not drawn to scale. Therefore, comparative sizes of layers should not be assumed from the Figures, and sizes, thicknesses, or dimensions may be assumed for some embodiments only where specifically indicated or discussed.

FIG. 1 is a diagram of an optical coherent receiver with integrated all-silicon optical hybrid, waveguide photodetectors and tunable local oscillator (LO), in accordance with various embodiments. Optical coherent receiver 100 is shown in FIG. 1, receiving an incoming optical signal at an optical input 102. In certain implementations, the incoming signal may be adjusted using an alignment output 104. The received optical signal may be split into a first optical path 106, that has a transverse electric (TE) polarization, and into a second optical path 108 that may also have a TE polarization.

Light in the first optical path 106 may travel to a MPD 110, which may be a main photo detector or other type of photo detector, then may travel into a variable optical attenuator (VOA) 116 that is coupled with a control mechanism 114. The optical output from the VOA 116 then may travel to a first input of a first multimode interference (MMI) hybrid 136. Similarly, light in the second optical path 108 may travel to a MPD 120, and then may travel into a VOA 126 that is coupled with a control mechanism 124. The optical output from the VOA 126 may travel to a MPD 128, and then into a first input of a second MMI hybrid 138.

A LO signal, having a TE polarization, is received at LO input 132, and then passes through a 50-50 splitter 134. In embodiments, the splitter may be a polarization splitter or polarization beam splitter. Each output of the 50-50 splitter 134 goes to a second input of the first MMI hybrid 136 and to a second input of the second MMI hybrid 138. The MMI hybrids 136, 138 have multiple optical output paths 140, each connecting with a high-speed photo detector (HSPD) 142. In legacy implementations, the HSPD 142 are based on either germanium (Ge) or indium phosphide (InP) materials because bulk silicon may not readily absorb light at datacom wavelengths, for example 1310 nm, or at telecom wavelengths, for example 1550 nm.

The plurality of HSPD 142 are electrically coupled, using copper pillars or through silicon vias (TSV) 144, to a bipolar CMOS (BiCMOS) chip 146. The BiCMOS chip 146 may include trans-impedance amplifiers (TIA), and/or an analog-to-digital converters (ADC). The BiCMOS chip 146 may then be electrically coupled via copper pillars or TSVs 148 with a digital signal processor chip 150 which is electrically coupled to a backplane 152.

Legacy implementations of a coherent receiver 100 are implemented using silicon-on-insulator (SOI) processes, with germanium (Ge) detectors without on-chip lasers to generate light. In these legacy implementations, a separate indium phosphide (InP) substrate are used for on-chip lasers and photodetectors. From a legacy manufacturing standpoint, the components that are in InP are unable to be created using CMOS foundry technologies. For these legacy implementations, a local oscillator (LO), for example a laser, is off-chip due to difficulties with integration of the LO during manufacturing.

Figure 2:
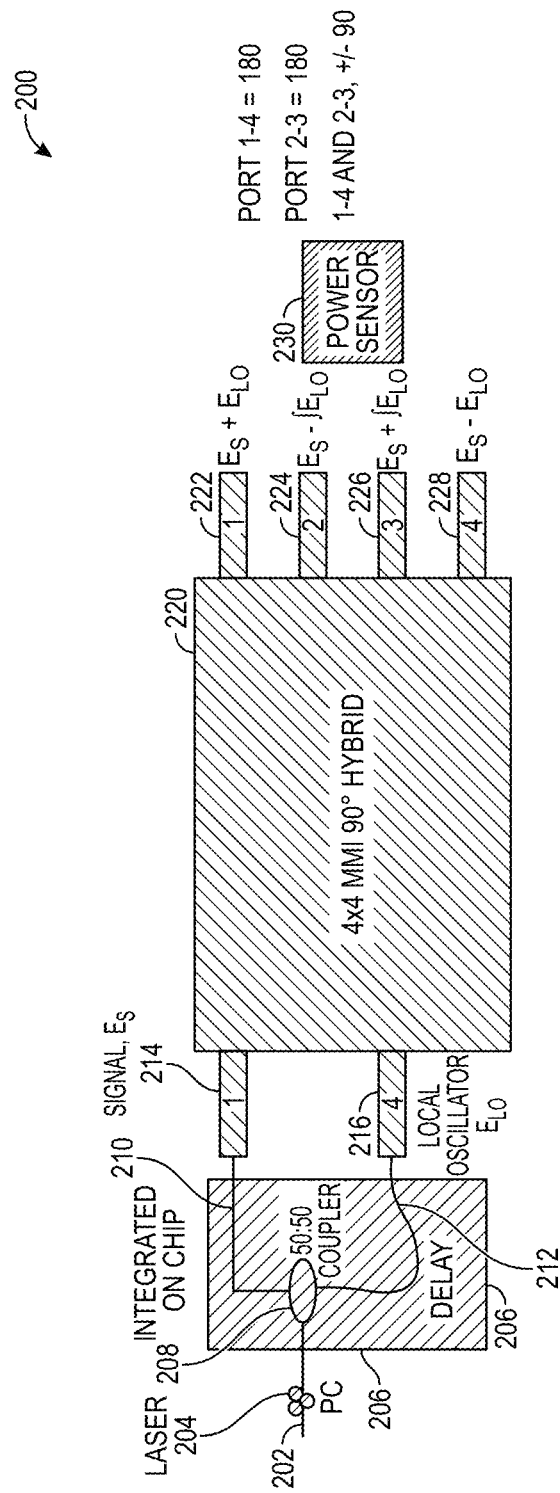
FIG. 2 is a diagram of an optical hybrid with silicon photodetectors and tunable lasers, including performance characteristics, in accordance with various embodiments.
Figure 2:
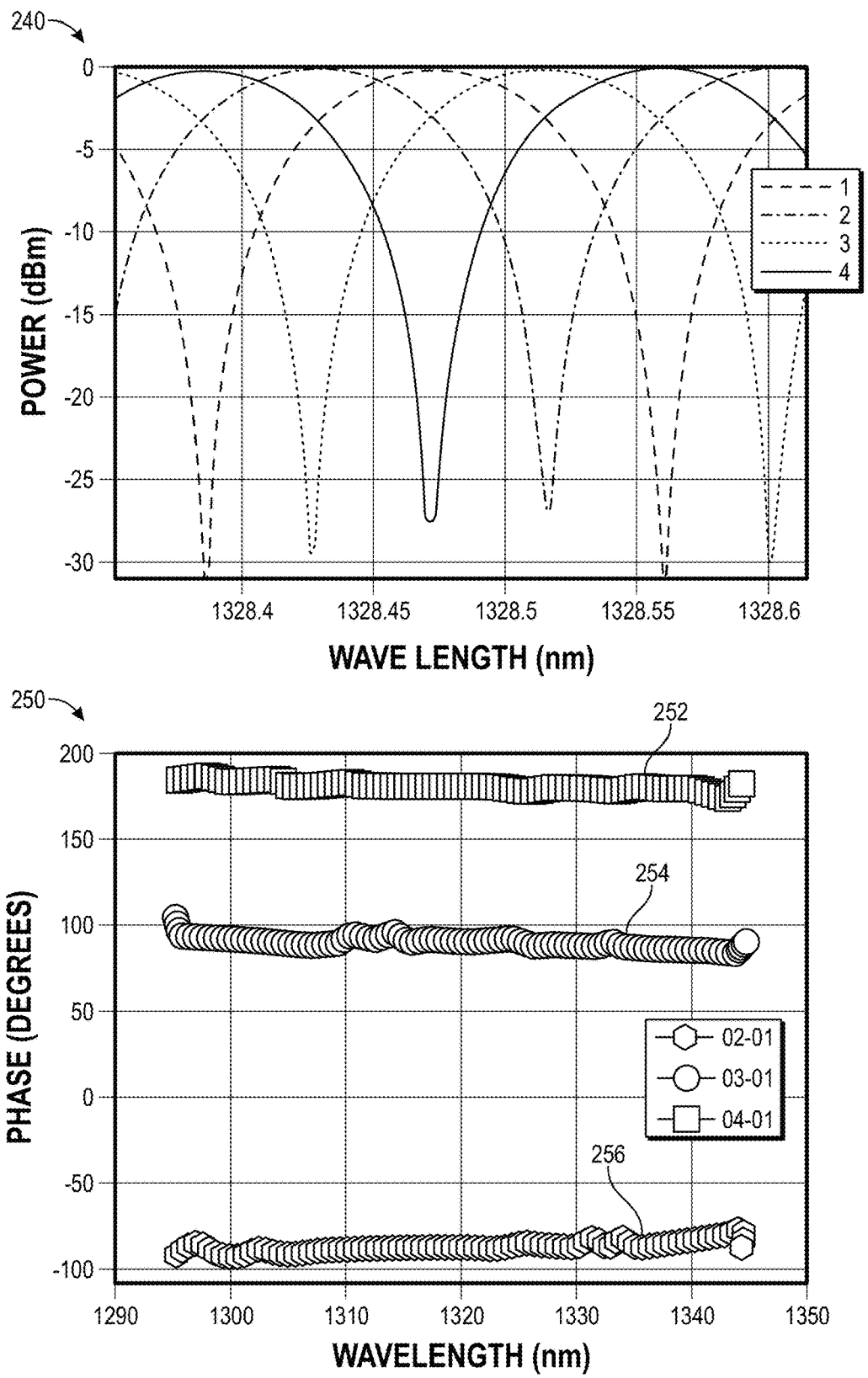

FIG. 2 is a diagram of an optical hybrid with silicon photodetectors and tunable lasers, including performance characteristics, in accordance with various embodiments. Coherent optical receiver 200 includes an optical hybrid 220, tunable local oscillator 216, semiconductor optical amplifiers (SOAs) that may be on the chip 206, and high-speed silicon waveguide-based photodetectors (SiPDs) created using CMOS technology, which may be included in power sensor 230. This embodiment may enable compact optical coherent receivers at a low cost, without using III-V or Ge-based implementations of components, on integrated silicon photonic chips for high-speed optical interconnect applications. Embodiments may also include optical hybrids, 64 gigabits per second (Gb/s) silicon photo detector (Si PD), >60 nm tunable lasers as discussed further below. The integration of these components in a single transmitter process may be accomplished without modification to a hybrid laser manufacture process. In embodiments, an on-chip SOAs can provide gain for link budget in addition to power budget savings and relaxed laser specification due to savings in power loss resulting from legacy coupling to an external laser.

With respect to the shown embodiment of the coherent optical receiver 200, light 202 will enter and pass through a PC 204, which may be a photonic coupler, and encounter a 50-50 coupler 208, where the light will be split into a first signal 210 and a second signal 212. In embodiments, the second signal 212 will be subject to a delay. The first signal 210 will enter a first input port 214 of the 4×4 multi-mode interference (MMI) 90° hybrid 220, where a characteristic of the signal is referred to as $E_S$. The second signal 212 will enter a second input port 216 of the 4×4 MMI 90° hybrid 220, where the signal 212 will be joined with a LO signal, where a characteristic of the signal is referred to as $E_{LO}$.

The output of the 4×4 MMI 90° hybrid 220 includes a first output port 222 with a signal having the characteristic of $E_S+E_{LO}$, a second output port 224 with the signal having the characteristic $E_S-fE_{LO}$, a third output port 226 with the signal having the characteristic $E_S+fE_{LO}$ and a fourth output port 228 with the signal having the characteristic of $E_S+fE_{LO}$. A power sensor 230 may be coupled with the output ports 222, 224, 226, 228. As shown, the first output port 222 and the fourth output port 228 may have 180° different phase, and the second output port 224 and the third output port 226 may have 180° different phases. The first output port 222 compared with the fourth output port 228 may be +/−90° phase, and the second output port 224 and the third output port 226 may be +/−90° phase.

In embodiments, the PC 204, 50-50 coupler 208, local oscillator generator 216, MMI 90° hybrid 220 that includes >60 nm tunable lasers, and power sensor 230 that includes 64 (Gb/s) SiPDs may be manufactured onto a same chip 206 using a CMOS process. In embodiments, these components may be integrated into a single transmitter process without any modification to a legacy hybrid laser process, for example, used to manufacture the 4×4 MMI 90° hybrid 220.

Diagrams 240 and 250 of FIG. 2 show responses of the 4×4 MMI 90° hybrid 220 during operation. Diagram 240 shows a graphed comparison of power versus wavelength of the signal from the first output port 222 (1), the second output port 224 (2), the third output port 226 (3), and the output power port 228 (4) of the 4×4 MMI 90° hybrid 220.

Diagram 250 shows a graphed comparison of phase in degrees versus wavelength in comparing the signals between: the second output port 224 and the first output port 222 (252), the third output port 226 and the first output port 222 (254), and the fourth output port 228 and the first output port 222 (256). Note that each graph line 252, 254, 256, has a relatively constant phase over the wavelengths from 1290 nm to 1350 nm.

Figure 3:
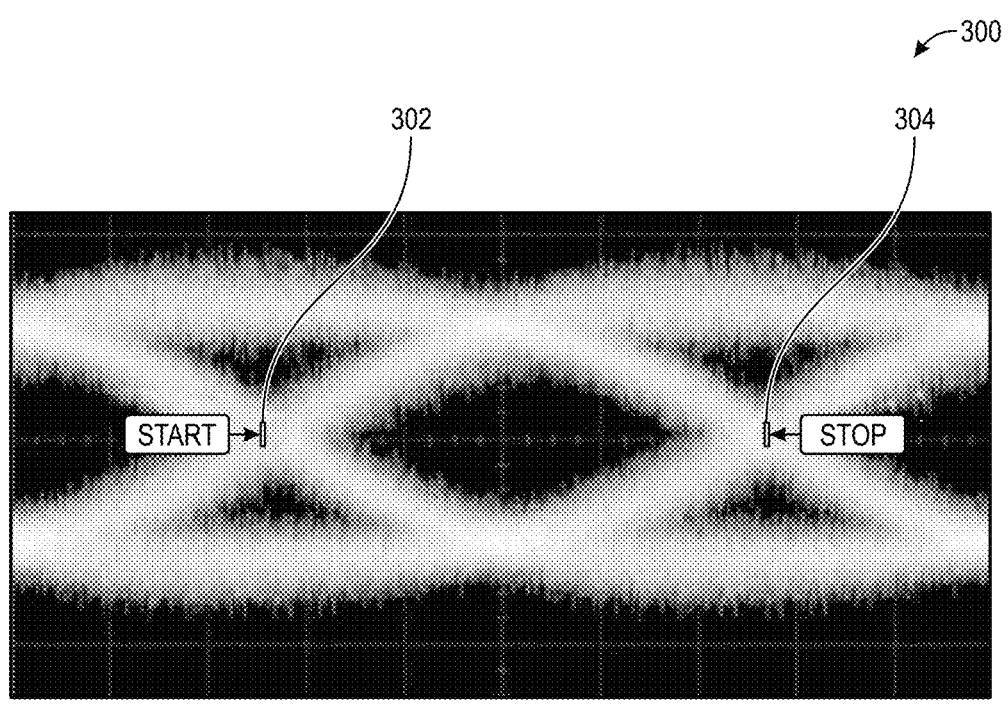
FIG. 3 illustrates an example eye diagram for silicon photodetectors, in accordance with various embodiments.

FIG. 3 illustrates an example eye diagram of silicon photodetectors, in accordance with various embodiments. Eye diagram 300 shows an operational example of an SiPD that may be located inside the power sensor 230 of FIG. 2. The 64 Gb/s eye diagram 300 shows a clear start 302 and a clear stop 304 within the eye diagram, indicating high-quality signals from the silicon-based coherent optical receiver.

Figure 4:
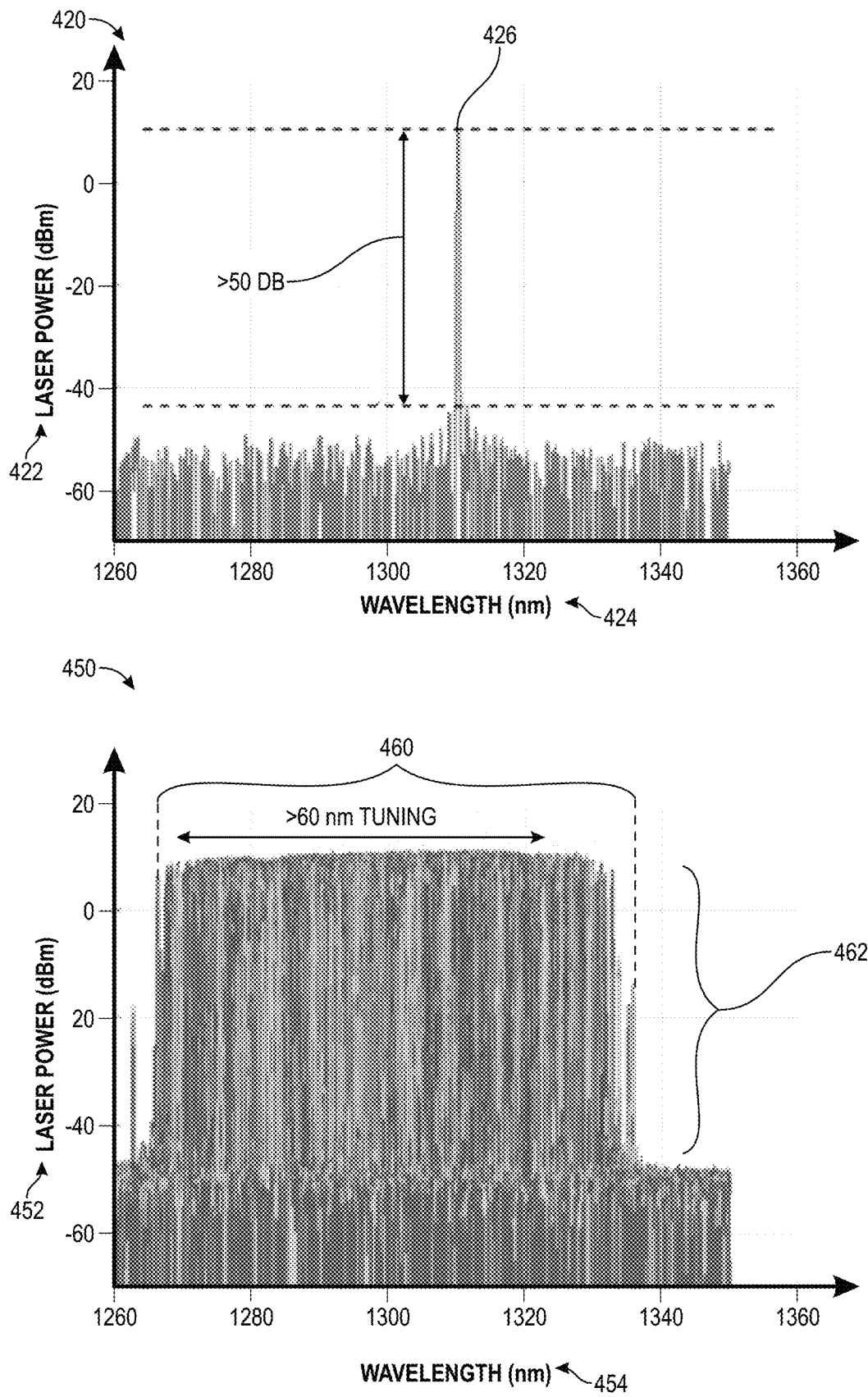
FIG. 4 illustrates measured spectrum and wideband tuning results for an optical hybrid with silicon photodetectors and tunable lasers, in accordance with various embodiments.

FIG. 4 illustrates measured spectrum and wideband tuning results for an optical hybrid with silicon photodetectors and tunable lasers, in accordance with various embodiments. Diagram 420 shows operationally, with respect to optical coherent receiver 200 of FIG. 2, a graph of laser power 422 in relation to wavelength 424. As shown, there is a greater than 50 dB difference between a normal range of values between 1260 and 1350 nm, and a spike 426 occurring around 1310 nm. This shows the accuracy of the tunable laser to a narrow wavelength range.

Diagram 450 shows operationally, with respect to optical coherent receiver 200 of FIG. 2, a graph of laser power 452 in relation to wavelength 454 in nanometers. As shown, there is a greater than 50 dB difference 462, among a wide wavelength range 460, resulting from a greater than 60 nm tuning.

Figure 5:
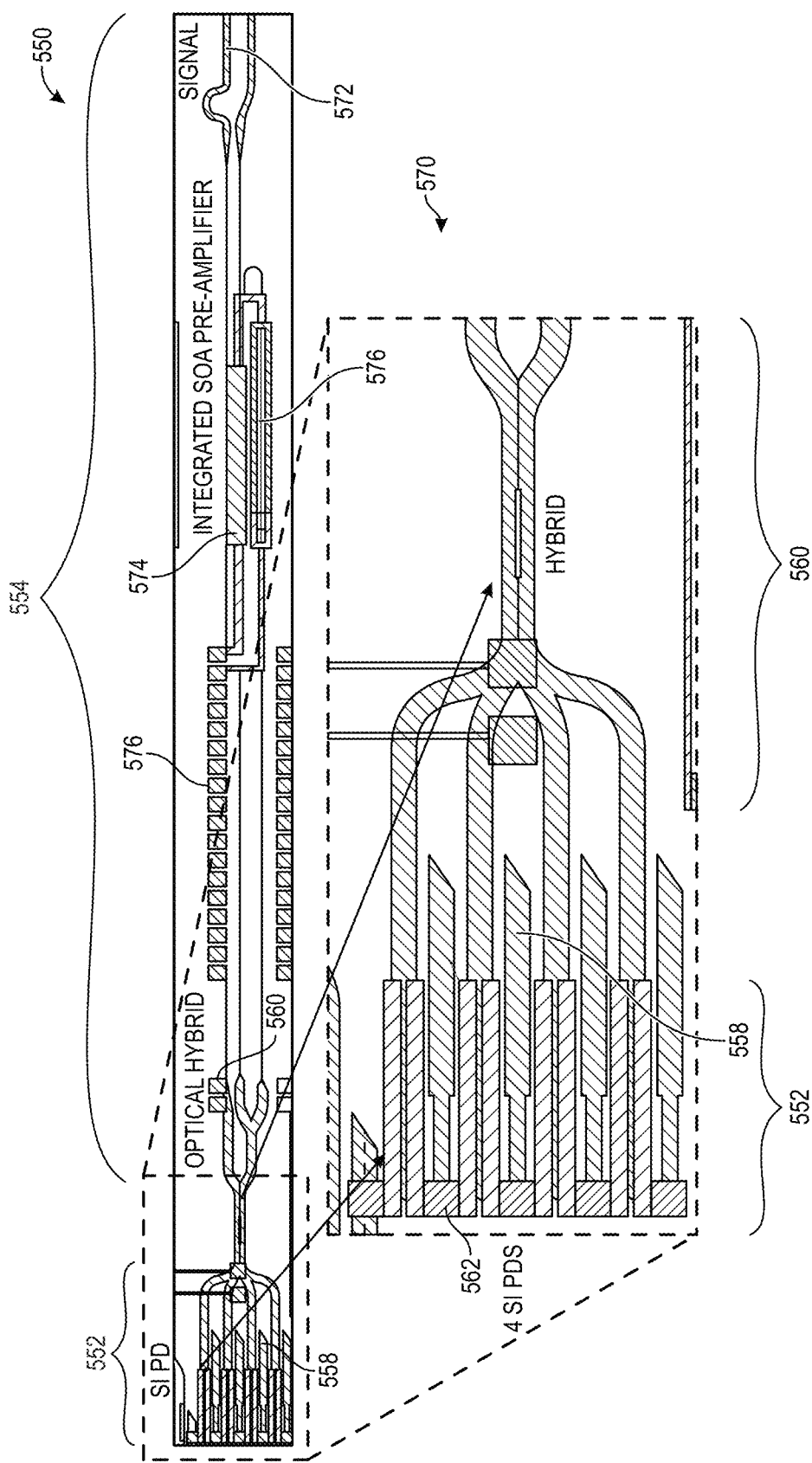
FIG. 5 illustrates a layout of a coherent receiver with integrated silicon photodetectors, optical hybrid, semiconductor operational amplifier (SOA), and a widely tunable laser, in accordance with various embodiments.

FIG. 5 illustrates a layout of a coherent receiver with integrated silicon photodetectors, optical hybrid, semiconductor operational amplifier (SOA), and a widely tunable laser, in accordance with various embodiments. Coherent optical receiver 550 is implemented using CMOS technology where the components described below of the coherent optical receiver 550 are implemented using silicon. In embodiments, the various components described below in the coherent optical receiver 550 do not include Ge- and/or InP-based materials. In embodiments, the coherent optical receiver 550 may be produced on a single chip.

Coherent optical receiver includes an optical input 572 that is optically coupled with an integrated SOA 574. In this embodiment, the SOA 574 may be implemented as an integrated SOA preamplifier. The SOA 574 is optically coupled with a LO 576 to form a combined optical signal, which travels down waveguide 576 and into the optical hybrid 560, which may be similar to the 4×4 MMI 90° hybrid 220 of FIG. 2. From the optical hybrid 560, the signal travels to multiple SiPDs 552. In embodiments, these may be high-speed SiPDs. Diagram 570 shows an exploded detail that includes the four silicon photodetectors 562 that are separated by material 558, and their optical coupling with the optical hybrid 560.

Figure 6:
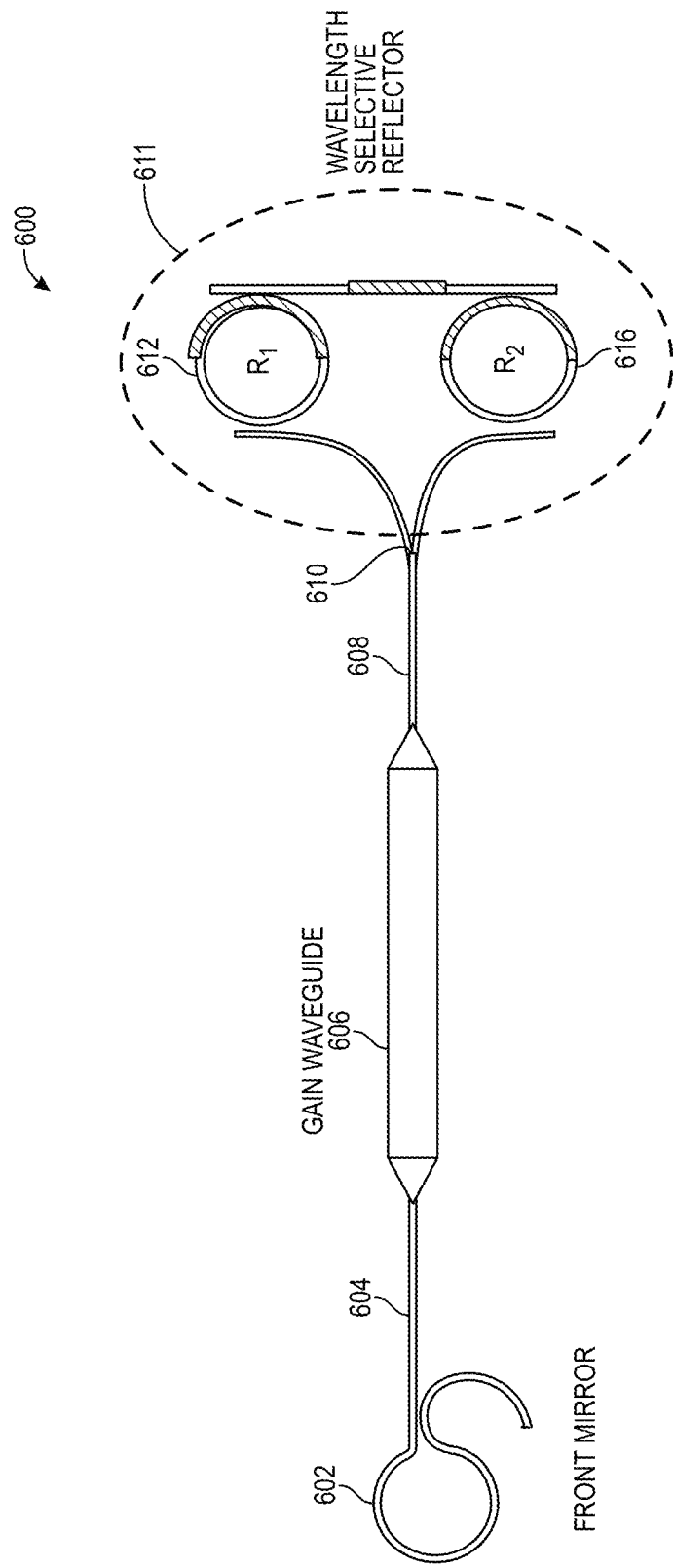
FIG. 6 is a schematic of a tunable laser with a gain waveguide and wavelength selective reflector, with a legacy heater power consumption tuning map and an example ring temperature tuning map, in accordance with various embodiments.
Figure 6:
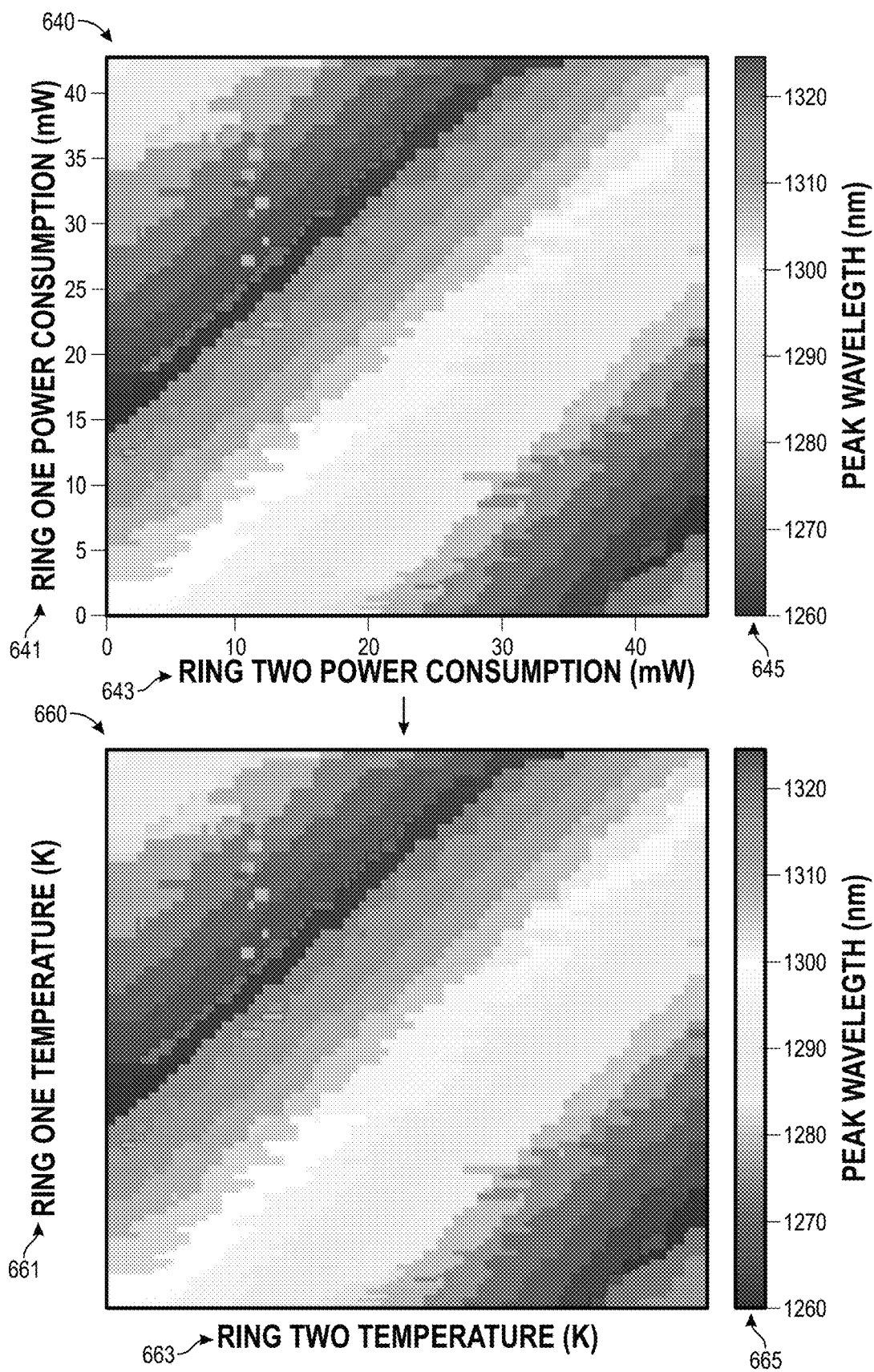

FIG. 6 is a schematic of a tunable laser with a gain waveguide and wavelength selective reflector, with a legacy heater power consumption tuning map and an example ring temperature tuning map, in accordance with various embodiments. As shown above, tunable semiconductor lasers may be used in many applications where a lasing wavelength can be tuned in a wide range, and may be accurately tuned within a defined wavelength target.

In legacy implementations, external wavelength lockers are used to provide an accurate wavelength reference, and the laser is locked to this wavelength reference. However, these legacy implementations only operate within a certain temperature range. Thus, widely tunable semiconductor lasers require active temperature control of the laser in order to accurately and repeatedly emit light at a desired wavelength. In these legacy implementations, the external wavelength locker and the active thermal control of the laser consumes power and increases the footprint and cost of the laser. These legacy implementations may rely on thermoelectric coolers to stabilize operating temperatures.

Embodiments described herein are directed to apparatus, systems, processes, and/or techniques to maintain laser wavelength accuracy across a wide operating temperature range and eliminate the need for an external wavelength locker and thermoelectric cooler. Embodiments may include fully integrated tunable lasers that operate without the use of a thermoelectric cooler and without an external wavelength locker.

Semiconductor tunable laser 600 includes a gain medium, such as the gain waveguide 606. In embodiments, the gain medium may include a hybrid III-V waveguide. One end of the gain waveguide 606 is optically coupled to a front mirror 602 via waveguide 604. The other end of the gain waveguide 606 is optically coupled with a wavelength tunable element such a reflector 611, or optical filter (not shown) via waveguide 608. In embodiments, the waveguide 608 may be split into two waveguides 610.

In embodiments, the reflector 611 may include one or more optical filters, such as gratings (not shown) or ring resonators 612, 616 that are optically coupled with the waveguide 608. The gratings (not shown) or ring resonators 612, 616, may be actively tuned to control for a lasing wavelength or for a range of lasing wavelengths. In embodiments, this tuning may be done through heating the element, or in this case, heating ring resonators 612, 616 as discussed further below.

Legacy tuning map 640 is a map that shows various values when comparing ring one 612 power consumption 641 with ring two 616 power consumption 643. The various values, shown as gradients, map to a peak wavelength value on peak wavelength scale 645. Thus, the legacy tuning map 640 is used to adjust heater power applied to the various resonators 612, 616 and the resulting wavelength generated, for example with a Vernier filter consisting of two ring resonators, such as reflector 611. However, legacy tuning map 640 may not hold over a wide temperature range because the same tuning power at different ambient temperatures would result in a different temperatures of the reflector, and ultimately result in the generation of different lasing wavelengths.

In embodiments, tuning map 660 is a map that shows various values when comparing ring one 612 temperature 661 with a ring two 616 temperature 663. The various values, shown as gradients, map to a peak wavelength value on peak wavelength scale 665. These temperatures, in embodiments, may be absolute reflector temperatures that are identified with the aid of embedded temperature sensors within the reflector as discussed below. Thus, the tuning map 660 would be applicable even during changes of ambient temperature.

Figure 7:
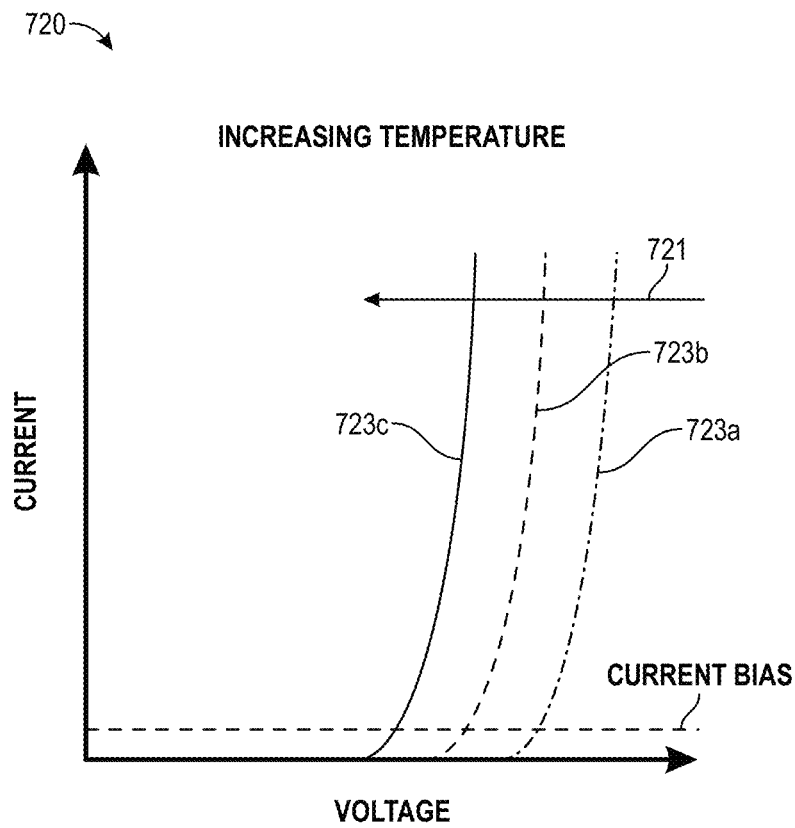
FIG. 7 shows graphs of forward biased diode I-V characteristics for different temperatures, in accordance with various embodiments FIGS. 8A-8B include schematics of two temperature sensors embedded within a ring resonator, in accordance with various embodiments.
Figure 7:
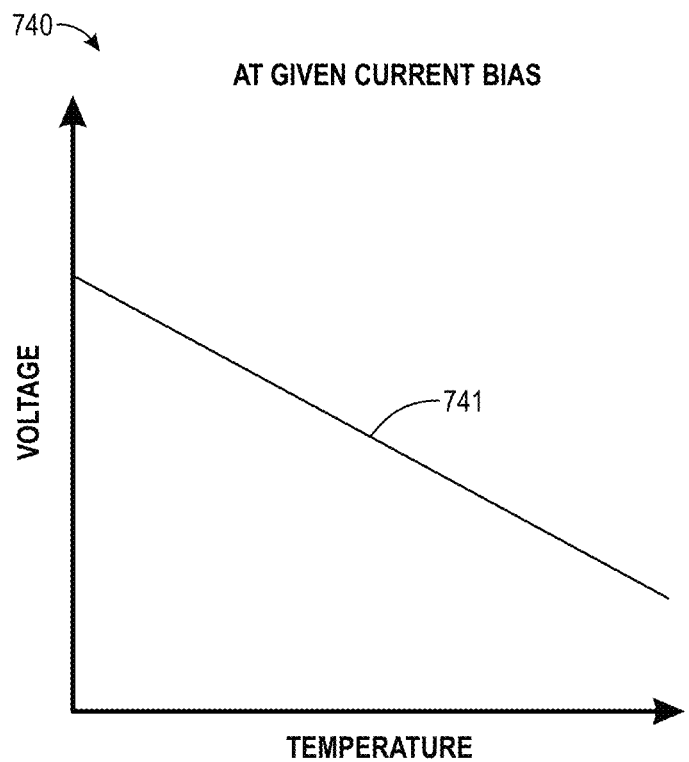

FIG. 7 shows graphs of forward biased diode I-V characteristics for different temperatures, in accordance with various embodiments. Graph 720 shows current as compared to voltage. As the temperature increases, the various curves 723a, 723b, 723c shift to the left 721 indicating a change in wavelength produced. Graph 740 shows voltage as compared to temperature. At a given current bias, there exists a linear relationship 741 between junction temperature and voltage.

Figure 8B:
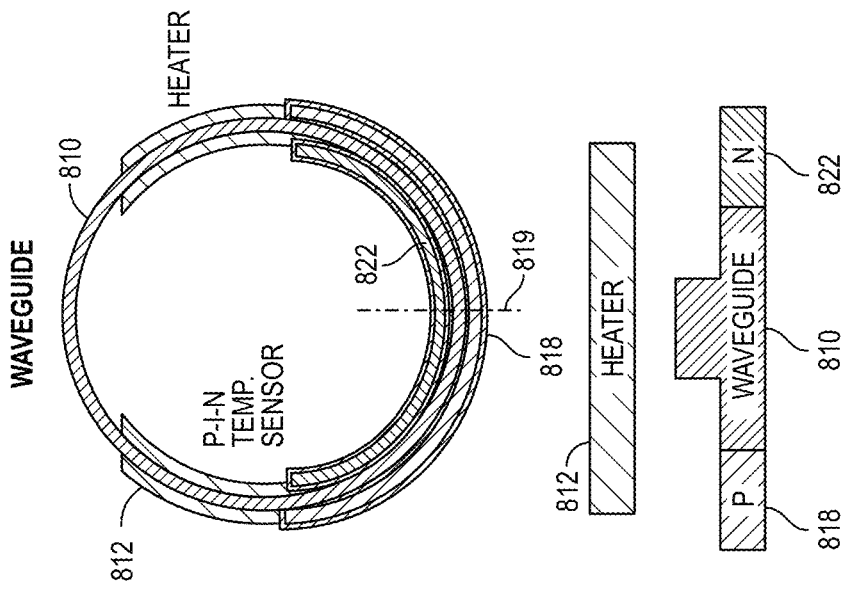
Figure 8A:
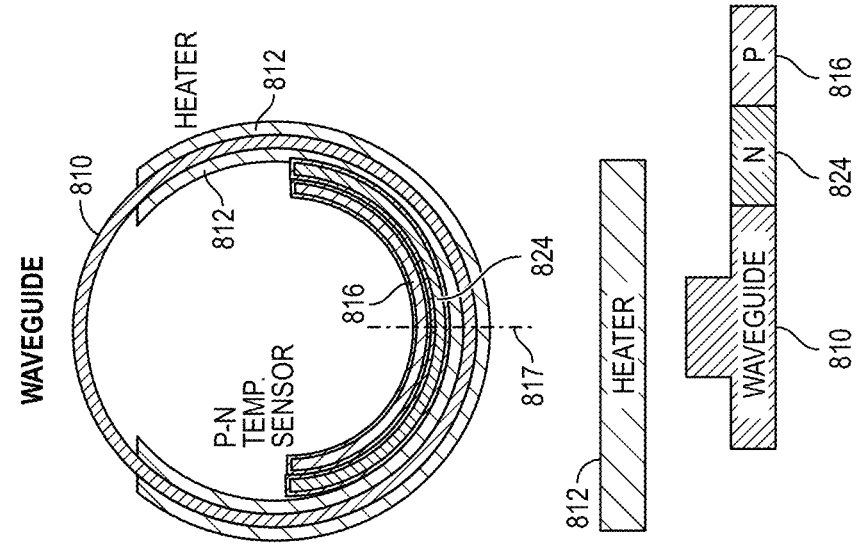

FIGS. 8A-8B include schematics of two temperature sensors embedded within a ring resonator, in accordance with various embodiments. In embodiments, a control loop (not shown) could be implemented to couple a temperature sensor and a heater as described below. In some embodiments, the control loop (not shown) would use information within the tuning map 660 of FIG. 6 to identify adjustments needed to the reflector temperature via the heater unit 812 to keep the reflector temperature at a desired value. This provides tunable laser operation without a thermoelectric cooler.

In embodiments, the lasing wavelength may be precisely defined by the Vernier filter temperature, which eliminates the need for a wavelength locker. A temperature sensor can be realized using a forward biased p-n or p-i-n diode. For a given current bias, the voltage across the diode is directly proportional to the junction temperature, as depicted in FIG. 7. A circuit (not shown) can be constructed to supply a small current and measure the voltage across the sensor in order to measure the local temperature of the diode.

FIG. 8A shows two views (see the cross section dotted line 817) of the ring reflector using a temperature sensor that is constructed as a p-n diode. As shown, a portion of a waveguide 810 is proximate to a heater element 812, which may be positioned as partially surrounding the waveguide 810 on one side. In this configuration, the temperature sensor is implemented as a forward biased p-n diode on the inner side of the ring, with the n-region 824 tangent to the waveguide and the p-region 816 tangent to the n-region 824 as shown. In embodiments, the sensor should not be in the optical path, which would result in increased optical loss, but should be placed in such a way that the p-n junction temperature is directly proportional to the waveguide 810 temperature.

FIG. 8B shows two views (see the cross section dotted line 819) of the ring reflector using a temperature sensor constructed as a p-i-n diode. As shown, a portion of the waveguide 810 is proximate to a heater element 812, which may be positioned as partially surrounding the waveguide 810 on one side. In this configuration, the temperature sensor is implemented as a forward biased p-i-n diode that is a part of the waveguide 810, with the p-region 818 on one side of the waveguide 810, and the n-region 822 on the other side of the waveguide 810 opposite the p-region 818. This configuration places the p-i-n diode directly in the optical path. This may also be referred to as the p-i-n diode embedded within the ring resonator. Note that a ring resonator is used in the examples shown in FIGS. 8A-8B, but embodiments may extend to grating-based devices as well.

Figure 9:
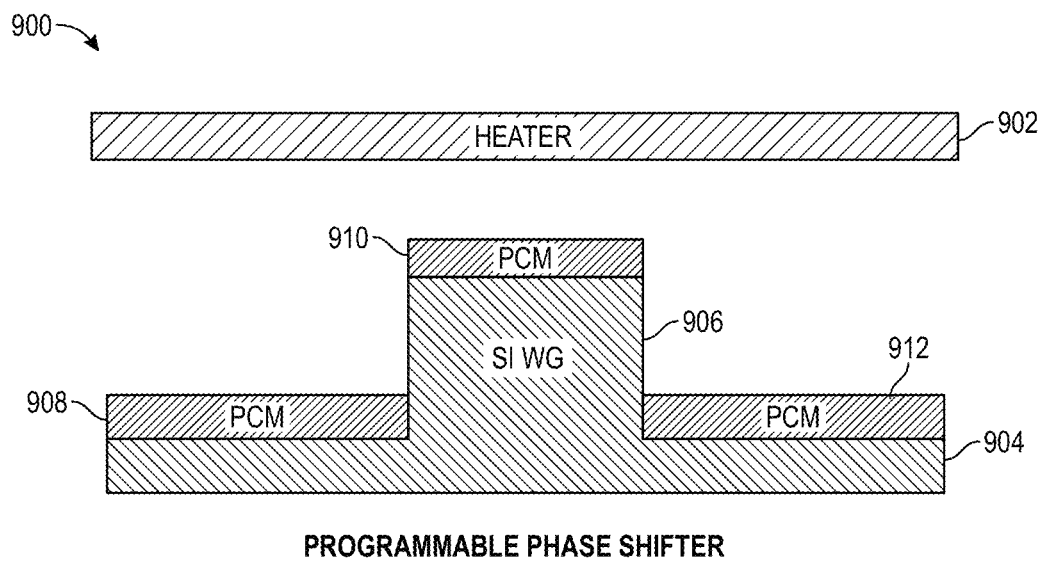
FIG. 9 is a diagram of a programmable phase shifter that includes deposited phase control material (PCM) and on-chip heating elements proximate to the deposited PCM, in accordance with various embodiments.

FIG. 9 is a diagram of a programmable phase shifter that includes deposited PCM and on-chip heating elements proximate to the deposited PCM, in accordance with various embodiments. In embodiments, phase shifter 900 may be used for post-process phase correction of optical hybrids and nested I/Q modulators. In legacy implementations, 90° optical hybrids are used to mix modulated signals with a local oscillator to generate desired signals to be used for coherent optical receivers. For higher order quadrature amplitude modulation (QAM) implementations, in-phase and quadrature-phase modulators are used with a 90° phase shifter between them, and in legacy implementations it is difficult to obtain the required phase shift accurately due to variations during the manufacture/fabrication process.

In legacy implementations, thermo-optic or electro-optic phase shifters are added to coherent receivers or I/Q modulators to correct its phase. These active phase shifters consume electrical power and may also introduce loss and non-linearity during operation.

In embodiments, phase shifter 900 may be used to replace legacy phase tuners with a programmable phase tuner that use implantation of Ge or another species, or PCM for post-process phase adjustments, which may also be referred to as phase trimming. In this way, phase shifter 900 may be used to set or correct for any phase errors introduced during the fabrication process. New fabrication actions that incorporate embodiments of the phase shifter 900 may be readily integrated into silicon photonic product fabrication flows.

In embodiments, phase shifter 900 creates a refractive index and/or optical phase trimmable section in a silicon device by depositing the PCM 908, 910, 912 onto a waveguide 904. In embodiments, the PCM may be placed on different surfaces of the waveguide 904. For example, PCM 910 may be applied to a highest surface of a taller portion 906 of the waveguide 904, while PCM 908 and PCM 912 may be applied to lower surfaces of the waveguide 904 as shown.

In embodiments, the PCM may include Ge, silicon, germanium antimony sulfur (GeSbS), germanium antimony selenium tellurium (Ge—Sb—Se—Te, or GSST), germanium antimony tellurium GeSbTe, (GST), or other suitable PCM. In embodiments, the thickness of the PCM on the waveguide 904 may range from 10 nm to 250 nm. One or more on-chip heating element 902 may be placed near the PCM regions as shown. In embodiments, the heating elements may include pn junctions or resistors. In embodiments, by applying a short optical or electrical pulses with very low energy, the PCM may be reversibly switched between an amorphous phase and a crystalline phase.

Figure 10:
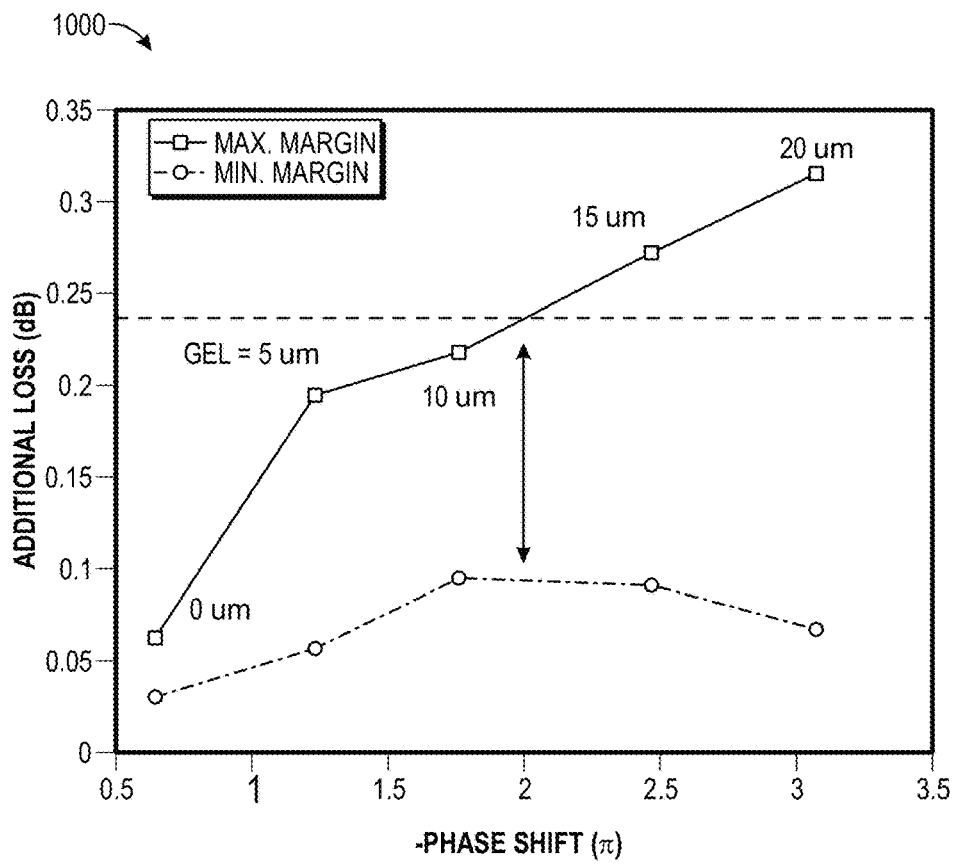
FIG. 10 is a graph showing dB loss with 180° phase shift from germanium (Ge) trimming, in accordance with various embodiments.

FIG. 10 is a graph showing dB loss with 180° (2π) phase shift from germanium (Ge) trimming, in accordance with various embodiments. Graph 1000 shows results from applying the a phase shifter with germanium implantation into a silicon photonics process. As shown, a 180° phase shift may be implemented and may result only with a loss of 0.1-0.2 dB.

Figure 11:
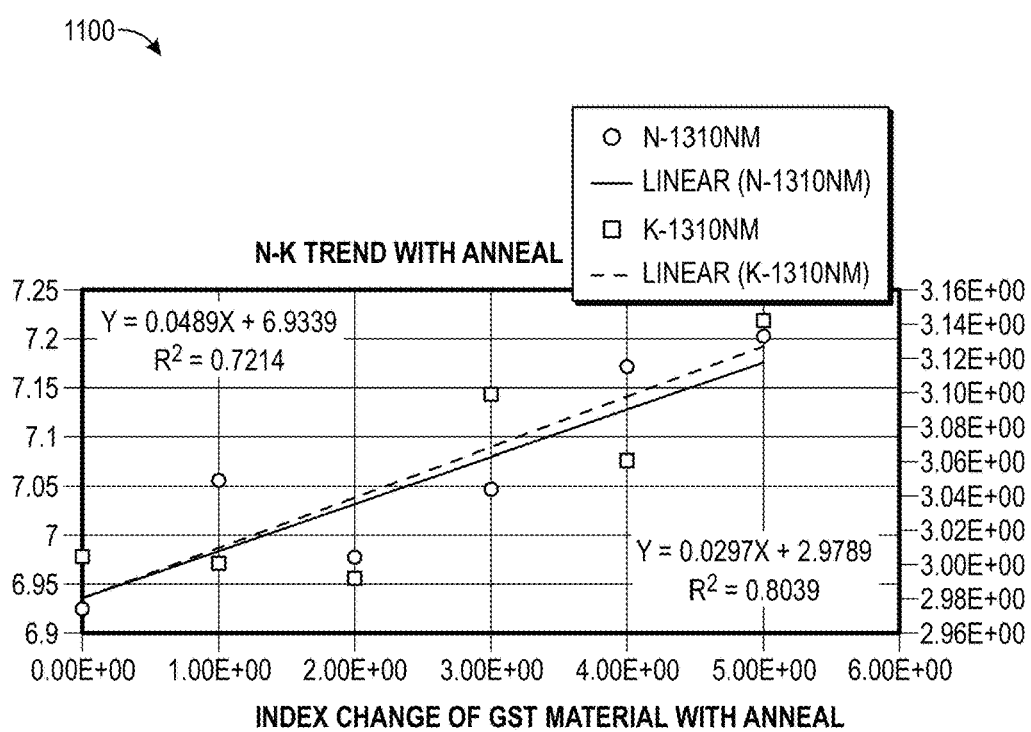
FIG. 11 is a graph showing optical index change under varying temperature conditions using certain PCM, in accordance with various embodiments.

FIG. 11 is a graph showing optical index change under varying temperature conditions using certain PCM, in accordance with various embodiments. Graph 1100 shows a changed real and imaginary optical index with different temperature conditions using GST/GSS material in the PCM, in accordance with embodiments.

Figure 12:
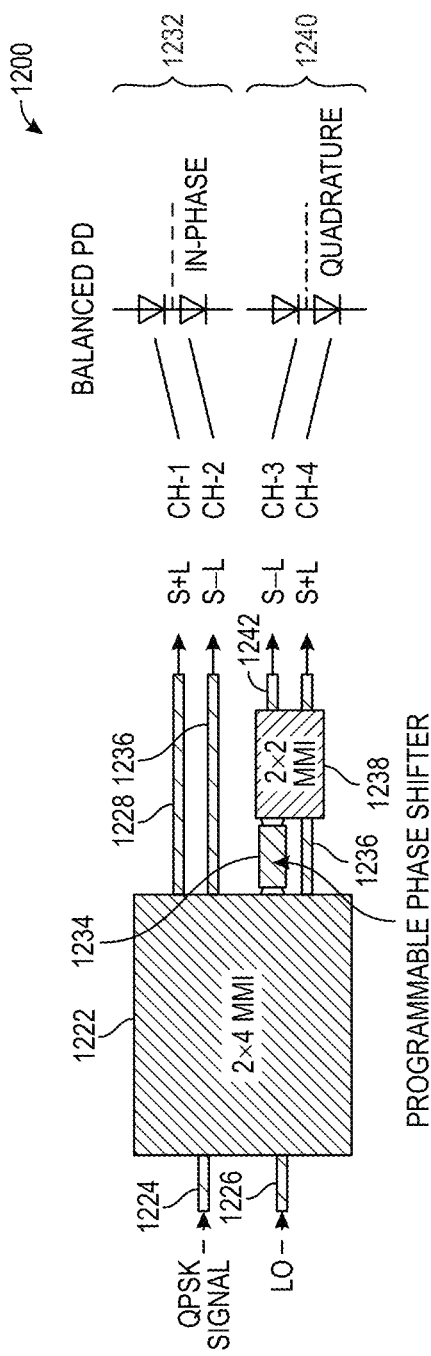
FIG. 12 illustrates a first example of an optical hybrid incorporating a programmable phase shifter, in accordance with various embodiments

FIG. 12 illustrates a first example of an optical hybrid incorporating a programmable phase shifter, in accordance with various embodiments. Optical hybrid 1200 shows a 2×4 MMI 1222 with a quadrature phase shift keying (QPSK) signal input 1224 and a LO input 1226. The 2×4 MMI 1222 has an output of the first channel 1228 and the second channel 1236, which form in-phase channels 1232. The output of the third channel 1242 first goes through the phase shifter 1234, which may be similar to phase shifter 900 of FIG. 9, before it joins the fourth channel 1236 into the 2×2 MMI 1238. The resulting output of the 2×2 MMI 1238 is the quadrature channels 1240. In legacy implementations, the phase shifter 1234 would be implemented using a thermal-optic or electro-optic phase shifter.

Figure 13:
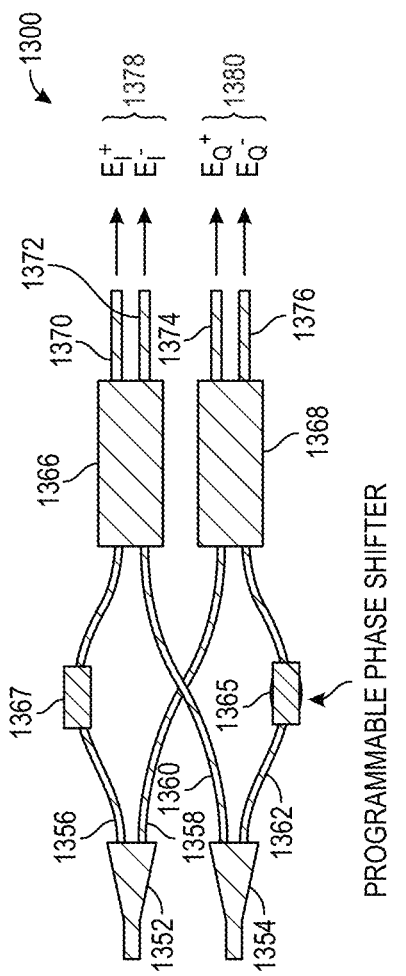
FIG. 13 illustrates a second example of an optical hybrid incorporating a programmable phase shifter, in accordance with various embodiments.

FIG. 13 illustrates a second example of an optical hybrid incorporating a programmable phase shifter, in accordance with various embodiments. Optical hybrid 1300 shows a first optical input 1352 and the second optical input 1354. The first optical input 1352 is split into a first path 1356, and a second path 1358. The second optical input 1354 is split into two paths, a third path 1360 and a fourth path 1362. The first path is optically coupled with the first phase shifter 1367, and the fourth path 1362 is optically coupled with a second phase shifter 1365. The first phase shifter 1367 and the second phase shifter 1365 may be similar to phase shifter 900 of FIG. 9.

The output of the first phase shifter 1367 and the third optical path 1360 serve as optical inputs to device 1366. The output of the second phase shifter 1365 and the second optical path 1358 serve as optical inputs to device 1368. The optical outputs 1370, 1372 of first device 1366 are in-phase channels 1378. The optical outputs 1374, 1376 of second device 1368 are quadrature phase channels 1380. In legacy implementations, the first phase shifter 1367 and the second phase shifter 1365 would be implemented by a thermal-optic or electro-optic phase shifter.

Figure 14:
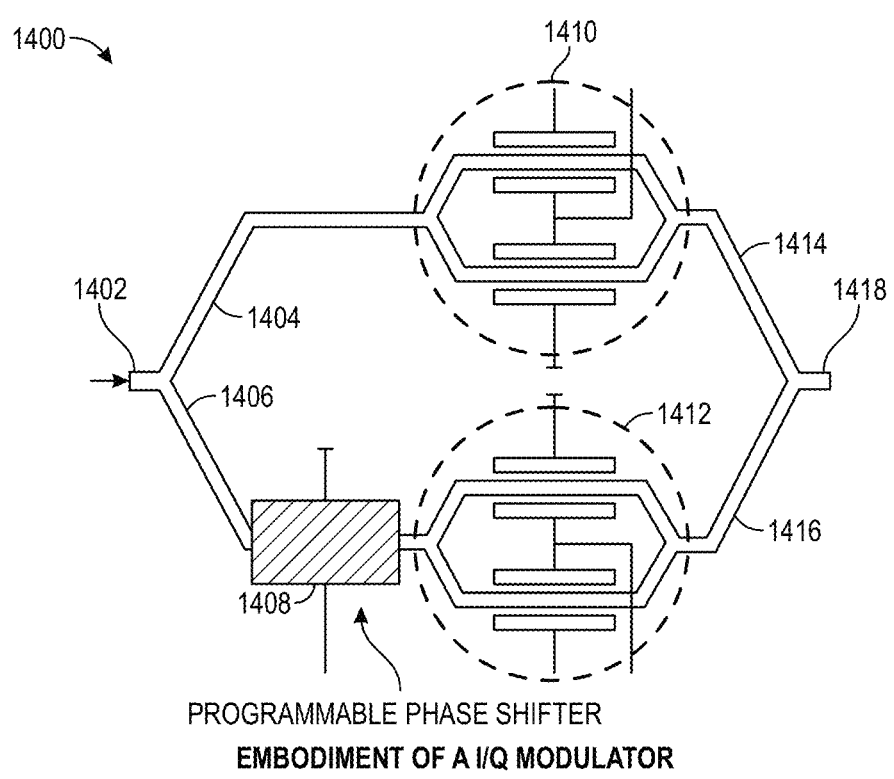
FIG. 14 illustrates an in-phase quadrature (I/Q) modulator incorporating a programmable phase shifter, in accordance with various embodiments.

FIG. 14 illustrates an I/Q modulator incorporating a programmable phase shifter, in accordance with various embodiments. I Q modulator 1400 includes an optical input 1402 that is split into a first optical path 1404 and a second optical path 1406. The first optical path 1404 is processed by a first component 1410, having an output optical path 1414. The second optical path 1406 enters phase shifter 1408, which may be similar to phase shifter 900 of FIG. 9. The optical output of the phase shifter 1408 is processed by a second component 1412, having an output optical path 1416. The output optical paths 1414 and 1416 are combined to create a final optical output 1418.

Figure 15:
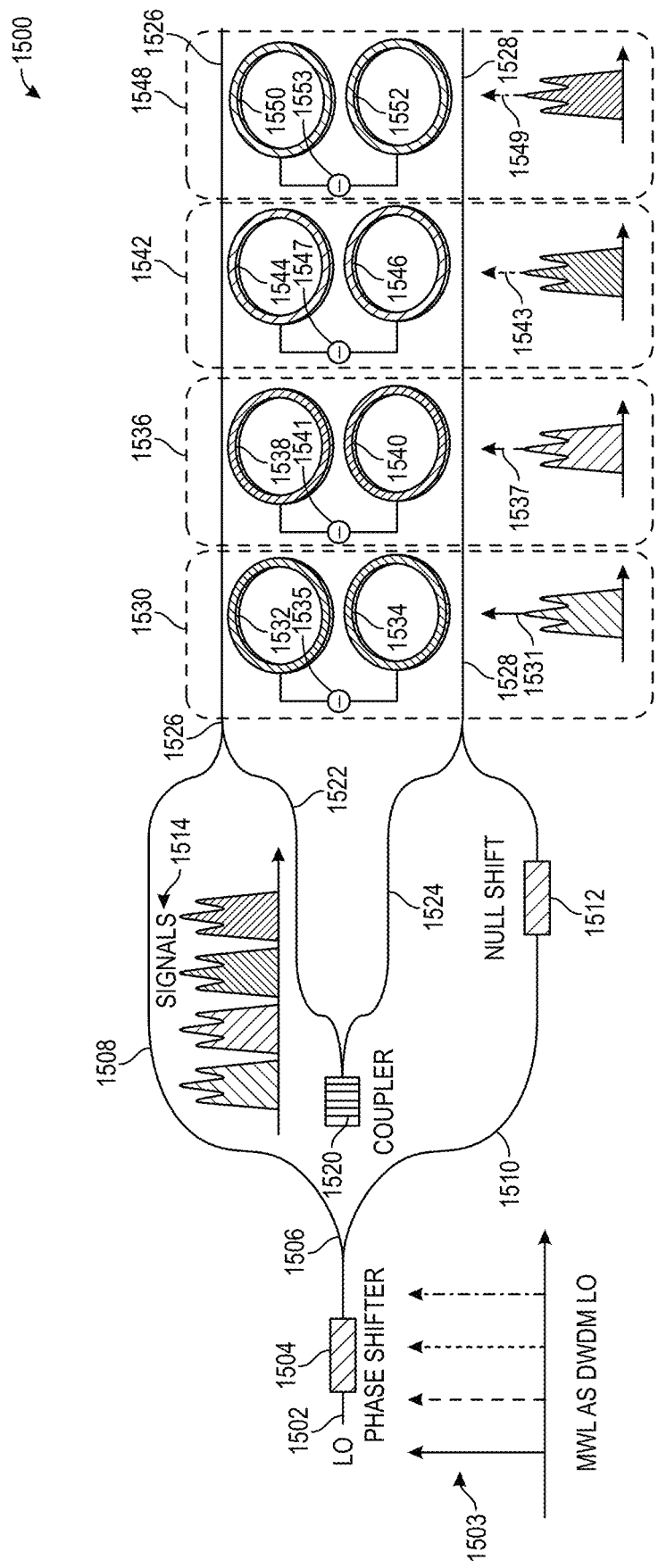
FIG. 15 illustrates a first example of a dense wavelength-division multiplexing (DWDM) coherent receiver based on microring demultiplexing photodetectors, in accordance with various embodiments.
Figure 16:
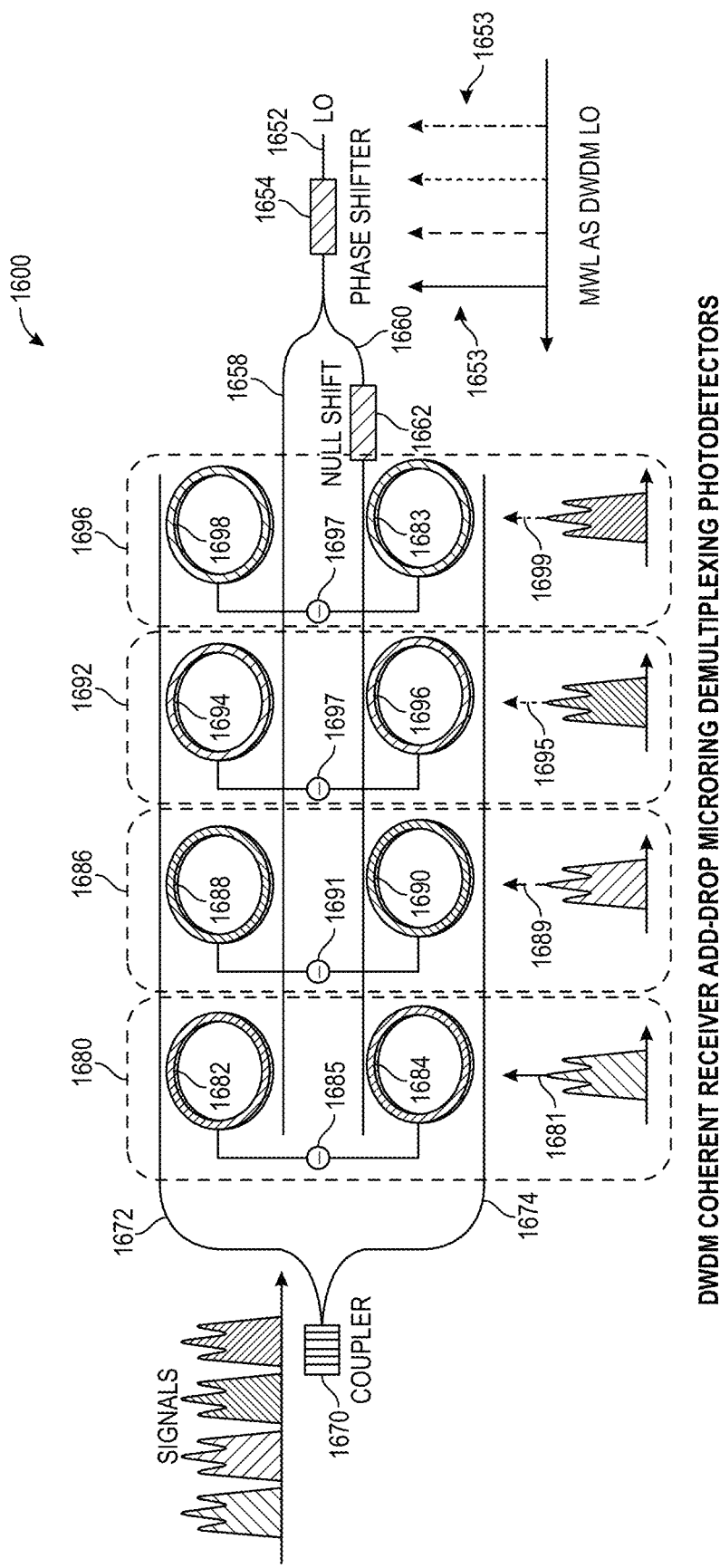
FIG. 16 illustrates a second example of a DWDM coherent receiver based on microring demultiplexing photodetectors, in accordance with various embodiments.

FIGS. 15-16 illustrate two examples of a DWDM coherent receiver based on microring demultiplexing photodetectors. The use of coherent optical communications can significantly increase data rates by exploiting multiple optical domains, including amplitude, phase, wavelength, and polarization. Legacy coherent receivers for DWDM use a dedicated demultiplexer to separate different data channels before mixing the resulting channels with the LO and passing the resulting to call signals to Ge or III-V based photodetectors. In legacy implementations, the demultiplexer is used first to separate incoming data channels to avoid crosstalk, and each individual data channel is combined with its corresponding LO. In addition, in legacy implementations Ge and III-V materials are required on the way for in order to integrate a photodetector on the chip. The use of these materials requires a series of complicated fabrication processes, resulting in higher manufacturing cost. Also, in legacy implementations multiple lasers may be needed to generate individual LO signals for each data channel.

In embodiments, compact silicon-based microrings may be used to simultaneously demultiplex and detect data in the data signal with the associated LO in a DWDM coherent optical communication system, in particular a coherent optical receiver. In embodiments, on- or off-chip multi-wavelength lasers (MWL) may be used to generate multiple LO signals to increase energy efficiency. Embodiments may reduce the complexity of a coherent optical receiver in both its configuration and the fabrication process, which may be fabricated with low cost on a silicon photonics platform.

In embodiments, the compact silicon-based microrings may share a common bus, which may be referred to as an optical bus, where each of the microrings may be used to mix one optical channel and its corresponding LO. Balance detection may be achieved by two identical, but uncoupled, microrings as described further below.

FIG. 15 illustrates a first example of a DWDM coherent optical receiver based on microring demultiplexing photodetectors, in accordance with various embodiments. Coherent optical receiver 1500 includes the use of all-pass microrings 1532, 1534, 1538, 1540, 1544, 1546, 1550, 1552. In embodiments, and all-pass micro ring has only one straight waveguide and ring, where the output of the ring is fed back into the straight waveguide.

A LO signal 1503 that includes multiple LOs on different wavelengths as shown, enters a phase shifter 1504 via optical path 1502. In embodiments, the phase shifter 1504 adjusts the phase of different LO signals at different wavelengths 1514. After processing the LO signal 1503 using the phase shifter 1504, the signal is split 1506 into a first path 1508 and a second path 1510. The second path 1510 is then processed by a π shift (180° phase shift) 1512.

A coupler 1520 receives the incoming multi-wavelength signal after which it is split into a first path 1522 and a second path 1524. The first path 1522 is joined with the LO signal first path 1508 to form optical path 1526. As shown, the optical path 1526 passes next to microrings 1532, 1538, 1544, 1550. The second optical path 1524 after the coupler 1520 is combined with the optical output of the π shift (180° phase shift) 1512 to form optical path 1528. As shown, optical path 1528 passes next to microrings 1534, 1540, 1546, 1552.

As shown, four microring couples 1530, 1536, 1542, 1548 used to demultiplex for a particular wavelength and to detect signals on that wavelength coming from the coupler 1520. The first microring couples 1530, which include microrings 1532, 1534, are used to identify wavelength 1531, and use detector 1535 to detect signals on wavelength 1531. The second microring couples 1536, which include microrings 1538, 1540, are used to identify wavelength 1537, and use detector 1541 to detect signals on wavelength 1537. The third microring couple 1542, which include microrings 1544, 1546, are used to identify wavelength 1543, and to use detector 1547 to detect signals on wavelength 1543. The fourth microring couple 1548, which include microrings 1550, 1552, are used to identify wavelength 1549, and use detector 1553 to detect signals on wavelength 1549.

FIG. 16 illustrates a second example of a DWDM coherent receiver based on add-drop microring demultiplexing photodetectors, in accordance with various embodiments. Coherent receiver 1600 includes a coupler 1672 receive multi-wavelength optical signals. After the coupler 1670, the optical path splits into a first path 1672, and a second path 1674. The first optical path 1672 passes along a first portion, respectively, of microrings 1682, 1688, 1694, 1698. The second optical path 1674 passes along a first portion, respectively, of microrings 1684, 1690, 1696, 1699. In embodiments, microrings 1682, 1688, 1694, 1698, 1684, 1690, 1696, 1699 may be add-drop microrings that include two straight waveguides 1672, 1658 or 1674, 1660. The input to a microring is from one of the straight waveguides, and the output of the microring is fed into the other straight waveguide.

A LO signal 1653, that includes multiple wavelengths, enters a phase shifter 1654 using optical path 1652. After the phase shifter, the LO optical path splits into a first LO optical path 1658 and into a second LO optical path 1660. The first LO optical path 1658 passes along a second portion, respectively, of microrings 1682, 1688, 1694, 1698. The second LO optical path 1660 goes through a π shift (180° phase shift) 1612, and then passes along a second portion, respectively, of microrings 1684, 1690, 1696, 1699.

As shown, four microring couples 1680, 1686, 1692, 1696 are used to demultiplex for a particular wavelength and to detect signals on that wavelength coming from the coupler 1670. The first microring couples 1680, which include microrings 1682, 1684, are used to identify wavelength 1681, and to use detector 1685 to detect optical signals on wavelength 1681. The second microring couples 1686, which include microrings 1688, 1690, are used to identify wavelength 1689, and to use detector 1691 to detect signals on wavelength 1689. The third microring couple 1692, which include microrings 1694, 1696, are used to identify wavelength 1695, and to use detector 1697 to detect signals on wavelength 1695. The fourth microring couple 1696, which include microrings 1698, 1683, are used to identify wavelength 1699, and to use detector 1697 to detect signals on wavelength 1699.

Figure 17:
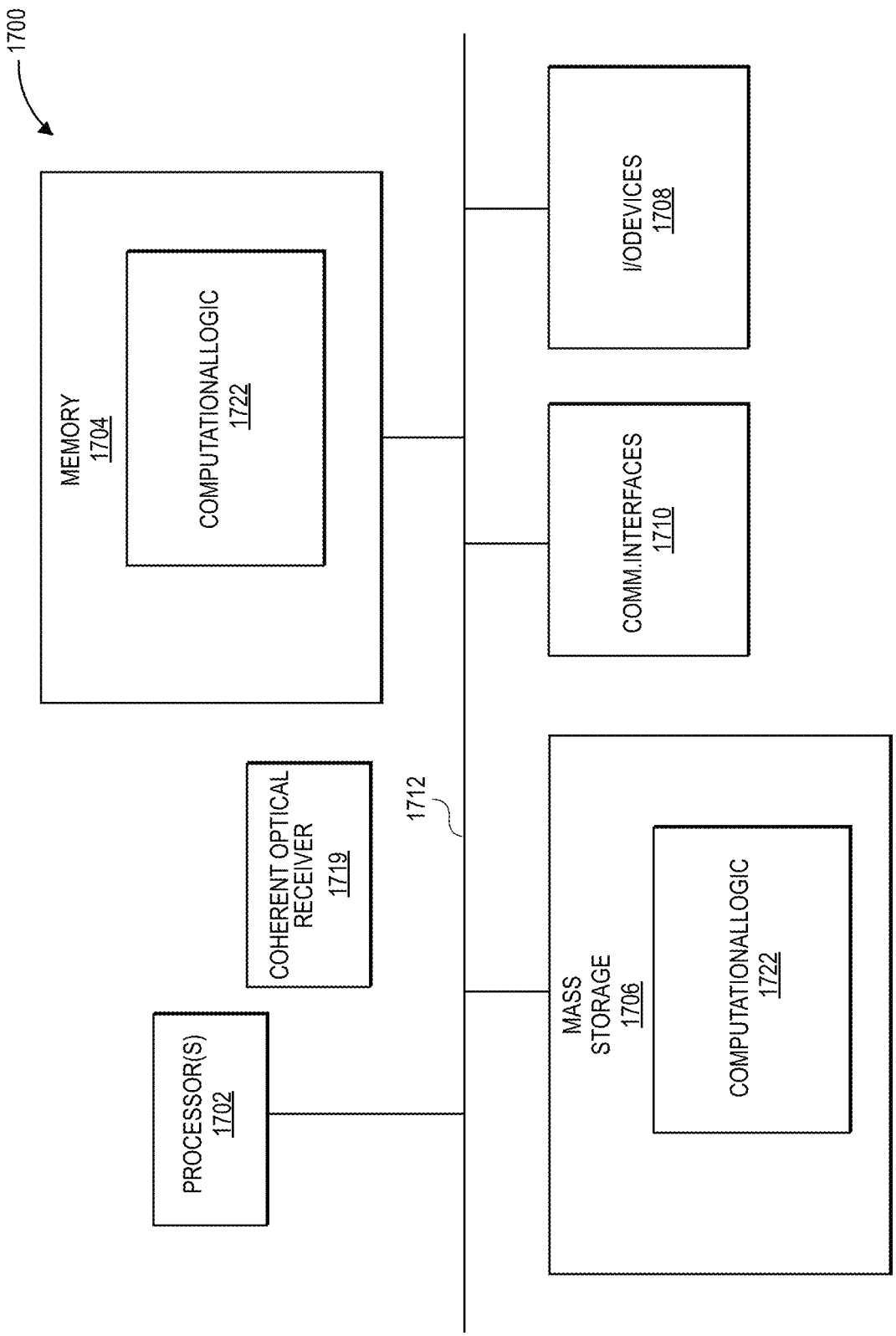
FIG. 17 illustrates an example computing device 1700 suitable for having various components of FIGS. 1-16, in accordance with various embodiments.

FIG. 17 illustrates an example computing device 1700 suitable for having components of FIGS. 1-16, in accordance with various embodiments.

As shown, computing device 1700 may include one or more processors or processor cores 1702, system memory 1704, mass storage 1706, communication interfaces 1710 and I/O devices 1708, coupled with each other via one or more buses/interconnects 1712. In various embodiments, at least one of the buses/interconnects 1712 is an optical bus/interconnect optically coupling/interconnecting at least two of processors 1702, system memory 1704, mass storage 1706, communication interfaces 1710 and I/O devices 1708. That is, the at least two of processors 1702, system memory 1704, mass storage 1706, communication interfaces 1710 and I/O devices 1708 being optically coupled include coherent optical transceiver 1719 having one of the embodiments of the coherent optical receiver earlier described with references to FIGS. 1-16.

For the purpose of this application, including the claims, the terms "processor" and "processor cores" may be considered synonymous, unless the context clearly requires otherwise. The processor 1702 may include any type of processors, a microprocessor, and the like. The processor 1702 may be implemented as an integrated circuit having multi-cores, e.g., a multi-core microprocessor.

Mass storage devices 1706 may be one of diskette, hard drive, volatile memory (e.g., dynamic random-access memory (DRAM), compact disc read-only memory (CD-ROM), digital versatile disk (DVD), and so forth. In general, system memory 1704 and/or mass storage devices 1706 may be temporal and/or persistent storage of any type, including, but not limited to, volatile and non-volatile memory, optical, magnetic, and/or solid state mass storage, and so forth. Volatile memory may include, but is not limited to, static and/or dynamic random access memory. Non-volatile memory may include, but is not limited to, electrically erasable programmable read-only memory, phase change memory, resistive memory, and so forth.

I/O devices 1708 may be a display (e.g., a touchscreen display)), keyboard, cursor control, remote control, gaming controller, image capture device, a camera, one or more sensors, and so forth and communication interfaces 1710 may include network interface cards, serial buses, modems, infrared receivers, radio receivers (e.g., Bluetooth), and so forth).

The communication interfaces 1710 may include communication chips (not shown) that may be configured to operate the device 1700 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond.

System buses/Interconnects 1712 may include, for example, PCIe buses. In other words, selected ones of processors 1702, memory 1704, mass storage 1706, communication interfaces 1710 and I/O devices 1708 may be PCIe devices or other serial bus-based devices. In particular, they may be PCIe devices incorporated with the teachings of the present disclosure to couple with or include an optical coherent receiver on a chip. In the case of multiple buses, they may be bridged by one or more bus bridges (not shown).

Each of these elements may perform its conventional functions known in the art. In particular, system memory 1704 and mass storage devices 1706 may be employed to store a working copy and a permanent copy of the programming instructions for the operation of various components of computing device 1700, including but not limited to an operating system of computing device 1700, one or more applications, and/or system software/firmware in support of practice of the present disclosure, collectively referred to as computing logic 1722. The various elements may be implemented by assembler instructions supported by processor(s) 1702 or high-level languages that may be compiled into such instructions.

The permanent copy of the programming instructions may be placed into mass storage devices 1706 in the factory, or in the field through, for example, a distribution medium (not shown), such as a compact disc (CD), or through communication interface 1710 (from a distribution server (not shown)). That is, one or more distribution media having an implementation of the agent program may be employed to distribute the agent and to program various computing devices.

The number, capability, and/or capacity of the elements 1702, 1704, 1706, 1708, 1710, and 1712 may vary, depending on whether computing device 1700 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, at least one of processors 1702 may be packaged together with computational logic 1722 configured to practice aspects of embodiments described herein to form a System in Package (SiP) or a System on Chip (SOC).

In various implementations, the computing device 1700 may be one or more components of a data center, a laptop, a netbook, a notebook, an ultrabook, a smartphone, a tablet, a personal digital assistant (PDA), an ultra mobile PC, a mobile phone, a digital camera, or an IoT user equipment. In further implementations, the computing device 1700 may be any other electronic device that processes data.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or to limit embodiments to the precise forms disclosed. While specific embodiments are described herein for illustrative purposes, various equivalent modifications are possible within the scope of the embodiments, as those skilled in the relevant art will recognize.

These modifications may be made to the embodiments in light of the above detailed description. The terms used in the following claims should not be construed to limit the embodiments to the specific implementations disclosed in the specification and the claims. Rather, the scope of the invention is to be determined entirely by the following claims, which are to be construed in accordance with established doctrines of claim interpretation.

The following paragraphs describe examples of various embodiments.

EXAMPLES

[Coherent Receiver with Integrated all-Si Waveguide Photodetectors and Tunable Local Oscillator]

Example 1 is an optical coherent receiver on a chip comprising: an optical amplifier to receive an optical signal and to generate an amplified signal based on the received optical signal; a local oscillator (LO) to generate a LO optical signal; an optical 90° hybrid optically coupled with the optical amplifier and the LO to receive the amplified signal and the LO optical signal, and to output a tuned optical signal; and a photodetector (PD) optically coupled with the optical hybrid to detect data on the tuned optical signal.

Example 2 may include the optical coherent receiver of example 1, wherein the optical coherent receiver is on an integrated silicon photonics chip.

Example 3 may include the optical coherent receiver of example 1, further comprising an interconnect to electrically couple with the photodetector to receive detected data.

Example 4 may include the optical coherent receiver of example 1, wherein the LO generator output is tunable.

Example 5 may include the optical coherent receiver of example 1, wherein the photodetector is a silicon waveguide photodetector.

Example 6 may include the optical coherent receiver of example 1, wherein the optical amplifier is a silicon-based optical amplifier.

Example 7 may include the optical coherent receiver of example 1, wherein the PD is a silicon PD.

Example 8 may include the optical coherent receiver of any one of examples 1-7, wherein the silicon PD operates at 64 gigabits per second (Gb/s).

Example 9 may be an optical coherent receiver on an integrated silicon photonics chip method, comprising: receiving a light beam into an optical amplifier on a silicon substrate to generate an amplified light beam; generating a local oscillator (LO) optical signal from a LO coupled to the silicon substrate; receiving, by an optical 90° hybrid coupled to the silicon substrate, the amplified light beam and the LO optical signal, the optical 90° hybrid to output a tuned optical signal; and receiving, by a photodetector (PD) coupled to the silicon substrate, the tuned optical signal to detect data on the tuned optical signal.

Example 10 may include the method of claim 9, further comprising receiving the detected data by an interconnect coupled with the PD.

Example 11 may include the method of example 10, wherein the interconnect is a selected one of: an interconnect bridge, an embedded multi-die interconnect bridge (EMIB), a silicon interposer, an open cavity bridge, organic routing on substrate, or a redistribution layer (RDL) on a substrate.

Example 12 may include the method of example 11, wherein the interconnect forms a high density electrical coupling.

Example 13 may include the method of example 9, wherein the optical 90° hybrid is a silicon hybrid.

Example 14 may include the method of example 9, wherein the photodetector is a silicon waveguide photodetector.

Example 15 may include the method of example 9, wherein the optical amplifier is a silicon-based optical amplifier.

Example 16 may include the method of example 9, wherein the PD is a silicon PD.

Example 17 may include the method of example 16, wherein the silicon PD operates at 64 gigabits per second (Gb/s).

Example 18 is a system comprising: an optical coherent receiver comprising: an optical amplifier to receive an optical signal and to generate an amplified signal based on the received optical signal; a local oscillator (LO) to generate a LO optical signal; an optical 90° hybrid optically coupled with the optical amplifier and the LO to receive the amplified signal and the LO optical signal, and to output a tuned optical signal; and a photodetector (PD) optically coupled with the optical hybrid to detect data on the tuned optical signal; an electrical interface to couple with the PD to route the detected data to another component and wherein a selected one or more of the optical amplifier, the LO, the 90° hybrid, or the PD are silicon-based components.

Example 19 may include the system of example 18, further comprising one or more optical fibers to optically couple with the optical amplifier.

Example 20 may include the system of example 18, wherein the system is implemented on a silicon substrate.

[Tunable III-V Si Hybrid Lasers with Integrated Temperature Sensors for Wavelength Control]

Example 21 may be a thermal apparatus to facilitate tuning a laser beam, the apparatus comprising: a thermal sensor to identify a temperature of a reflector of the laser beam, the thermal sensor being proximate to the reflector; and circuitry coupled with the thermal sensor to: receive the identified temperature of the reflector; and based upon the received identified temperature of the reflector, adjust a temperature of a heating element proximate to the reflector to keep a temperature of the reflector within a range of temperature values.

Example 22 may include the thermal apparatus of example 21, wherein the heating element is directly coupled with the reflector.

Example 23 may include the thermal apparatus of example 21, wherein the reflector includes a grating.

Example 24 may include the thermal apparatus of example 21, wherein the reflector includes a ring resonator.

Example 25 may include the thermal apparatus of example 24, wherein the thermal sensor is a p-n diode.

Example 26 may include the thermal apparatus of example 25, wherein a p silicon element and an n silicon element are on an inside of a ring of the ring resonator.

Example 27 may include the thermal apparatus of example 24, wherein the thermal sensor is a p-i-n diode.

Example 28 may include the thermal apparatus of example 27, wherein a p silicon element is on an inside of a ring and an n silicon element is on an outside of the ring of the ring resonator.

Example 29 may be a method to facilitate tuning a laser, the method comprising: thermally coupling a thermal sensor to a reflector of the laser; receiving a temperature of the reflector; and based upon the received temperature, adjusting a temperature of a heating element proximate to the reflector to keep a temperature of the reflector within a range of temperature values.

Example 30 may include the method of example 29, wherein the reflector includes a grating.

Example 31 may include the method of example 29, wherein the reflector includes a ring resonator.

Example 32 may include the method of example 31, wherein the thermal sensor is a p-n diode.

Example 33 may include the method of example 32, wherein a p silicon element and an n silicon element are on an inside of a ring of the ring resonator.

Example 34 may include the method of example 31, wherein the thermal sensor is a p-i-n diode.

Example 35 may include the method of example 34, wherein a p silicon element is on an inside of a ring and an n silicon element is on an outside of the ring of the ring resonator.

Example 36 may be a laser apparatus comprising: an optical gain element; a reflector optically coupled to the optical gain element; and a thermal apparatus coupled with the reflector to facilitate tuning the laser apparatus, the thermal apparatus comprising: a thermal sensor to identify a temperature of a reflector of the laser proximate to the thermal sensor; and circuitry coupled with the thermal sensor to: receive the identified temperature of the reflector; and based upon the received identified temperature of the reflector, adjust a power level of a heating element proximate to the reflector to keep the temperature of the reflector within a range of temperature values.

Example 37 may include the laser apparatus of example 36, wherein the optical gain element is a hybrid II-V waveguide.

[Method and Apparatus for Post-Process Phase Correction of Optical Hybrid and Nested IQ Modulators]

Example 38 may be an optical phase tuner, comprising: an optical waveguide with a first side and a second side opposite the first side, wherein the first side has a first level and a second level different from the first level; a material applied to a surface of the first level of the first side and to a surface of the second level of the first side; and a thermal element proximate to the applied material to provide thermal energy to the applied material to tune an optical phase of light traveling within the waveguide.

Example 39 may include the optical phase tuner of example 38, wherein the thermal element further includes a selected one of: a p-n junction or a resistor.

Example 40 may include the optical phase tuner of example 38, wherein the applied material is a phase change material (PCM).

Example 41 may include the optical phase tuner of example 40, wherein PCM includes a selected one of: germanium (Ge), silicon (Si), geranium-antimony-sulfur (GeSbS), geranium-antimony-selenium-tellurium (Ge—Sb—Se—Te, or GSST), geranium-antimony-tellurium (GeSbTe, or GST).

Example 42 may include the optical phase tuner of example 38, wherein the thermal element is substantially parallel to the first side of the optical waveguide.

Example 43 may include the optical phase tuner of example 38, wherein the thermal element produces thermal energy from a first edge of the optical waveguide to a second edge of the optical waveguide opposite the first edge.

Example 44 may be a method for implementing an optical phase tuner, the method comprising: identifying an optical waveguide with a first side and a second side opposite the first side, wherein the first side has a first level and a second level different from the first level; applying a material to a surface of the first level of the first side and to a surface of the second level of the first side; and positioning a thermal element proximate to first side of the optical waveguide to provide thermal energy to the applied material to tune an optical phase of light traveling within the waveguide.

Example 45 may include the method of example 44, further comprising heating the thermal element proximate to the first side of the optical waveguide to tune the optical phase of light traveling within the waveguide.

Example 46 may include the method of example 45, wherein the applied material is a phase change material (PCM).

Example 47 may include the method of example 46, wherein PCM includes a selected one of: germanium (Ge), silicon (Si), geranium-antimony-sulfur (GeSbS), geranium-antimony-selenium-tellurium (Ge—Sb—Se—Te, or GSST), geranium-antimony-tellurium (GeSbTe, or GST).

Example 48 may be an optical coherent receiver, comprising: a first optical input device with an optical input, a first optical output, and a second optical output, the first optical output coupled with an input of a first optical phase tuner; a second optical input device with an optical input, a first optical output, and a second optical output, the second optical output coupled with an input of a second optical phase tuner; a first optical output device with a first optical input coupled with an output of the first optical phase tuner and a second optical input coupled with the first optical output of the second optical input device; and a second optical output device with a first optical input coupled with the second optical output of the first optical input device and a second optical input coupled with the output of the second optical phase tuner.

Example 49 may include the optical coherent receiver of example 48, wherein an optical phase tuner further comprises: an optical waveguide with a first side and a second side opposite the first side, wherein the first side has a first level and a second level different from the first level; a material applied to a surface of the first level of the first side and to a surface of the second level of the first side; and a thermal element proximate to the applied material to provide thermal energy to the applied material to tune an optical phase of light traveling within the waveguide.

[DWDM Coherent Receiver Based on Microring Demultiplexing Photodetectors]

Example 50 may be an apparatus for photo detection on multiple wavelengths of light, the apparatus comprising: a first input to receive a first optical signal that includes a first plurality of wavelengths, wherein each of the first plurality of wavelengths includes a local oscillator signal for the particular wavelength; a second input to receive a second optical signal that includes a second plurality of wavelengths, wherein each of the second plurality of wavelengths is correspondingly associated, with one of the first plurality of wavelengths; and a plurality of microring pairs optically coupled with the first input and the second input, each microring pair associated with a different one of the first and second plurality of wavelengths, to detect, respectively, a presence or an absence of photons on the second optical signal for the different second plurality of wavelengths.

Example 51 may include the apparatus of example 50, wherein the plurality of microring pairs are a selected one of: all-pass microrings or add-drop microrings.

Example 52 may include the apparatus of example 50, wherein the plurality of microring pairs are all-pass microrings; and wherein the first input is split into first two paths and the second input is split into second two paths, a first path of the first input and a first path of the second input are combined to form a combined first path to couple with a first part of each of the plurality of microring pairs; and wherein a second path of the first input and a second path of the second input are combined to form a combined second path to couple with a second part of the each of the plurality of microring pairs.

Example 53 may include the apparatus of example 52, further comprising a phase shifter disposed on the second path of the first input before the second path of the first input is combined with the second path of the first input.

Example 54 may include the apparatus of example 52, further comprising a phase shifter disposed on the first input before the first input is split into the first two paths.

Example 55 may include the apparatus of example 52, wherein a local oscillator (LO) is on a carrier phase of the first optical signal.

Example 56 may include the apparatus of example 50, wherein the plurality of microring pairs are add-drop microrings; wherein the first input is split into a first path and a second path, the first path to couple with a first part of a first one of the microring pairs and with a first part of a second one of the microring pairs for each of the plurality of the microring pairs; and wherein the second input is split into a third path and a fourth path, the third path to couple with a second part of the first one of the micro ring pairs and with a second part of the second one of the microring pairs for each of the plurality of the microring pairs.

Example 57 may include the apparatus of example 56, further comprising a phase shifter disposed on the second path of the first input after the split of the first input and prior to coupling with a microring.

Example 58 may be a method for photo detection on multiple wavelengths of light, the method comprising: receiving a first optical signal that includes a plurality of wavelengths, to carry a local oscillator signal for each of the respective wavelengths; receiving a second optical signal that includes a plurality of wavelengths related, respectively, to the plurality of wavelengths of the first optical signal; optically coupling the first optical signal and the second optical signal with a plurality of pairs of microrings; and detecting, by one or more of the plurality of the pairs of microrings, a presence or an absence of a photon on the second optical signal associated with a wavelength, respectively, of the one or more of the plurality of microrings.

Example 59 may include the method of example 58, further comprising tuning the first optical signal to align with the second optical signal.

Example 60 may include the method of example 59, wherein a phase shifter is used to tune the first optical signal.

What is claimed is:

1. An optical coherent receiver on a chip comprising:
   an optical amplifier on the chip, wherein the optical amplifier is to receive an optical signal and to generate an amplified signal based on the received optical signal;
   a local oscillator (LO) on the chip, wherein the LO is to generate an LO optical signal;
   an optical 90° hybrid on the chip, wherein the optical 90° hybrid is optically coupled with the optical amplifier and the LO on the chip, and wherein the optical 90° hybrid is to receive the amplified signal and the LO optical signal, and to output a tuned optical signal; and
   a silicon waveguide photodetector (SiPD) on the chip, wherein the SiPD is optically coupled with the optical hybrid on the chip, and wherein the SiPD is to detect data on the tuned optical signal.

2. The optical coherent receiver of claim 1, wherein the chip is an integrated silicon photonics chip.

3. The optical coherent receiver of claim 1, further comprising an interconnect to electrically couple with the photodetector to receive detected data.

4. The optical coherent receiver of claim 1, wherein the LO generator output is tunable.

5. The optical coherent receiver of claim 1, wherein the optical amplifier is a silicon-based optical amplifier.

6. The optical coherent receiver of claim 1, wherein the SiPD operates at 64 gigabits per second (Gb/s).

7. A method of forming an optical coherent receiver on an integrated silicon photonics chip, the method comprising:
   forming, based on a complimentary metal-oxide semiconductor (CMOS) process, an optical amplifier on a silicon substrate of the integrated silicon photonics chip, wherein the optical amplifier is configured to receive a light beam into the optical amplifier to generate an amplified light beam;
   forming, based on the CMOS process, a local oscillator (LO) on the silicon substrate of the integrated silicon photonics chip, wherein the LO is configured to generate an LO optical signal;
   forming, based on the CMOS process, an 90° hybrid on the silicon substrate of the integrated silicon photonics chip, wherein the optical 90° hybrid is configured to generate, based on the amplified light beam and the LO optical signal, a tuned optical signal; and
   forming, based on the CMOS process, a silicon-waveguide photodetector (SiPD) on the silicon substrate of the integrated silicon photonics chip, wherein the SiPD is configured to detect data on the tuned optical signal.

8. The method of claim 7, further comprising receiving the detected data by an interconnect coupled with the SiPD.

9. The method of claim 8, wherein the interconnect is a selected one of: an interconnect bridge, an embedded multi-die interconnect bridge (EMIB), a silicon interposer, an open cavity bridge, organic routing on substrate, or a redistribution layer (RDL) on a substrate.

10. The method of claim 7, wherein the optical 90° hybrid is a silicon hybrid.

11. The method of claim 7, wherein the optical amplifier is a silicon-based optical amplifier.

12. The method of claim 7, wherein the SiPD operates at 64 gigabits per second (Gb/s).

13. A system comprising:
- an optical coherent receiver on a chip, wherein the optical coherent receiver on the chip includes:
  - an optical amplifier on the chip, wherein the optical amplifier is configured to receive an optical signal and to generate an amplified signal based on the received optical signal;
  - a local oscillator (LO) on the chip, wherein the LO is configured to generate an LO optical signal;
  - an optical 90° hybrid on the chip, wherein the optical 90° hybrid is optically coupled with the optical amplifier and the LO, and wherein the 90° hybrid is configured to output a tuned optical signal based on the amplified signal and the LO optical signal; and
  - a silicon waveguide photodetector (SiPD) on the chip, wherein the SiPD is optically coupled with the optical hybrid and configured to detect data on the tuned optical signal;
- an electrical interface coupled with the SiPD, wherein the electrical interface is configured to route the detected data to another component; and
- wherein the optical amplifier, the LO, and the 90° hybrid are silicon-based components.

14. The system of claim 13, further comprising one or more optical fibers to optically couple with the optical amplifier.

15. The system of claim 13, wherein the chip includes a silicon substrate.

* * * * *